(12) United States Patent
Krasilnikov et al.

(10) Patent No.: US 12,301,673 B2
(45) Date of Patent: *May 13, 2025

(54) MANAGED CONNECTIVITY BETWEEN CLOUD SERVICE EDGE LOCATIONS USED FOR LATENCY-SENSITIVE DISTRIBUTED APPLICATIONS

(71) Applicant: Amazon Technologies, Inc., Seattle, WA (US)

(72) Inventors: Nikolay Krasilnikov, Seattle, WA (US); Upendra Bhalchandra Shevade, Washington, DC (US); Theodore Joseph Maka'iwi DeRego, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,088

(22) Filed: Oct. 10, 2023

(65) Prior Publication Data
US 2024/0040002 A1  Feb. 1, 2024

Related U.S. Application Data

(63) Continuation of application No. 17/809,864, filed on Jun. 29, 2022, now Pat. No. 11,824,943.

(51) Int. Cl.
*H04L 67/141* (2022.01)
*H04L 12/46* (2006.01)
*H04L 67/10* (2022.01)

(52) U.S. Cl.
CPC ........ *H04L 67/141* (2013.01); *H04L 12/4641* (2013.01); *H04L 67/10* (2013.01)

(58) Field of Classification Search
CPC ... H04L 67/141; H04L 12/4641; H04L 67/10; H04L 12/4633
See application file for complete search history.

(56) References Cited

U.S. PATENT DOCUMENTS

| 8,539,079 B2 | 9/2013 | Thireault |
| 9,125,047 B2 | 9/2015 | Sundaresan et al. |

(Continued)

OTHER PUBLICATIONS

Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.

(Continued)

*Primary Examiner* — Cheikh T Ndiaye
(74) *Attorney, Agent, or Firm* — Robert C. Kowert; Kowert, Hood, Munyon, Rankin & Goetzel, P.C.

(57) ABSTRACT

A control plane server of a virtualized computing service determines that connectivity is to be established between a first portion and a second portion of a distributed application. The first portion runs at a first edge location of a provider network, and the second portion runs at a second edge location. The control plane server transmits metadata associated with the second edge location to a connectivity manager at the first edge location. The metadata is used to establish a secure network channel between the connectivity manager and the second edge location. A message from the first portion of the distributed application is sent to the second portion via the channel.

20 Claims, 10 Drawing Sheets

(56) References Cited

U.S. PATENT DOCUMENTS

| | | | |
|---|---|---|---|
| 9,703,660 | B2 | 7/2017 | Cillis et al. |
| 9,838,268 | B1* | 12/2017 | Mattson .................. H04L 41/32 |
| 9,876,851 | B2 | 1/2018 | Chandramouli et al. |
| 10,064,242 | B2 | 8/2018 | Pawar et al. |
| 10,135,702 | B2 | 11/2018 | Lahiri |
| 10,244,507 | B2 | 3/2019 | Tarlazzi et al. |
| 10,257,105 | B2 | 4/2019 | Majmundar et al. |
| 10,419,550 | B2 | 9/2019 | Nainar et al. |
| 10,581,717 | B2 | 3/2020 | Tejaprakash et al. |
| 10,594,456 | B2 | 3/2020 | Park et al. |
| 10,608,734 | B2 | 3/2020 | Barbieri et al. |
| 10,705,808 | B2 | 7/2020 | Chiosi et al. |
| 10,749,721 | B2 | 8/2020 | Fertonani et al. |
| 10,750,514 | B2 | 8/2020 | Fujinami |
| 10,817,409 | B2 | 10/2020 | Zeng et al. |
| 10,880,173 | B2 | 12/2020 | Seenappa et al. |
| 10,891,140 | B1 | 1/2021 | Levin |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,356,500 | B1 | 6/2022 | Gupta et al. |
| 11,539,582 | B1 | 12/2022 | Gupta et al. |
| 11,552,842 | B2 | 1/2023 | Barabell |
| 11,720,425 | B1 | 8/2023 | Yang et al. |
| 11,743,117 | B2 | 8/2023 | Gupta |
| 11,800,404 | B1 | 10/2023 | Yang |
| 11,824,943 | B1 | 11/2023 | Krasilnikov et al. |
| 11,916,999 | B1 | 2/2024 | Gupta |
| 11,937,103 | B1 | 3/2024 | Krasilnikov |
| 11,985,065 | B2 | 5/2024 | Shevade et al. |
| 2012/0127151 | A1 | 5/2012 | Murakami |
| 2018/0146375 | A1 | 5/2018 | Pawar et al. |
| 2018/0365635 | A1 | 12/2018 | Lucrecio et al. |
| 2019/0042326 | A1 | 2/2019 | Chilikin |
| 2019/0158606 | A1 | 5/2019 | Guim Bernat et al. |
| 2019/0165906 | A1 | 5/2019 | Bala et al. |
| 2019/0190785 | A1 | 6/2019 | Power |
| 2019/0213029 | A1 | 7/2019 | Liu et al. |
| 2019/0394826 | A1 | 7/2019 | Wang et al. |
| 2019/0289497 | A1 | 9/2019 | Rajagopal |
| 2019/0391855 | A1 | 12/2019 | Bernat et al. |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0144517 | A1 | 5/2021 | Guim Bernat et al. |
| 2021/0144555 | A1 | 5/2021 | Kim et al. |
| 2021/0243770 | A1 | 8/2021 | Roessler |
| 2021/0271517 | A1 | 9/2021 | Guim Bernat |
| 2021/0279161 | A1 | 9/2021 | Tameshige |
| 2022/0030117 | A1 | 1/2022 | Young et al. |
| 2022/0046084 | A1* | 2/2022 | Nair .................. H04N 21/4334 |
| 2022/0070734 | A1 | 3/2022 | Rajagopal |
| 2022/0377615 | A1 | 11/2022 | Radunovic |
| 2023/0315534 | A1 | 10/2023 | Asawa et al. |
| 2023/0325266 | A1 | 10/2023 | Yang |
| 2023/0409362 | A1 | 12/2023 | Shevade |
| 2023/0409363 | A1 | 12/2023 | Shevade |
| 2024/0202153 | A1 | 6/2024 | Huang |
| 2024/0202157 | A1 | 6/2024 | Paterra |
| 2024/0205680 | A1 | 6/2024 | Paterra |
| 2024/0236178 | A1 | 7/2024 | Gupta et al. |

OTHER PUBLICATIONS

Unknown, "5G; NG-RAN; Architecture Description", Technical Specification, ETSI TS 138 401, Version 16.8.0, Release 16, Jan. 2022, pp. 1-82.

U.S. Appl. No. 17/548,391, filed Dec. 10, 2021, Ammar Latif.

U.S. Appl. No. 17/364,791, filed Jun. 30, 2021, Diwakar Gupta.

U.S. Appl. No. 17/364,788, filed Jun. 30, 2021, Diwakar Gupta.

U.S. Appl. No. 17/364,779, filed Jun. 30, 2021, Diwakar Gupta.

U.S. Appl. No. 17/326,221, filed May 20, 2021, Ximeng Simon Yang.

U.S. Appl. No. 17/806,684, filed Jun. 13, 2022, Benjamin Wojtowicz.

U.S. Appl. No. 17/806,685, filed Jun. 13, 2022, Benjamin Wojtowicz.

U.S. Appl. No. 17/807,343, filed Jun. 16, 2022, Upendra Bhalchandra Shevade et al.

U.S. Appl. No. 17/807,344, filed Jun. 16, 2022, Upendra Bhalchandra Shevade et al.

U.S. Appl. No. 17/807,341, filed Jun. 16, 2022, Upendra Bhalchandra Shevade et al.

U.S. Appl. No. 17/808,518, filed Jun. 23, 2022, Ozgur Dural.

U.S. Appl. No. 17/810,319, filed Jun. 30, 2022, Julius Mueller, at al.

U.S. Appl. No. 17/820,542, filed Aug. 17, 2022, Nikolay Krasilnikov, et al.

U.S. Appl. No. 18/146,126, filed Dec. 23, 2022, Diwakar Gupta.

U.S. Appl. No. 18/067,651, filed Dec. 16, 2022, Frank Paterra.

U.S. Appl. No. 18/067,650, filed Dec. 16, 2022, Jiandong Huang.

U.S. Appl. No. 18/066,943, filed Dec. 15, 2022, Awaiz Ahmad Khan.

U.S. Appl. No. 18/067,654, filed Dec. 16, 2022, Frank Paterra.

U.S. Appl. No. 18/630,891, filed Apr. 9, 2024, Shevade, et al.

\* cited by examiner

Network address of peer secure connectivity manager (SCM) 702

Protocol identifier and version 706 to be used for edge-to-edge secure channel

Security artifacts 710 to be used to set up edge-to-edge secure channels (e.g., cryptographic keys, certificates, etc.) and/or encrypt messages Isolated virtual network (IVN) configuration information 716 to be used for transmitting messages between distributed application components, such as virtual network interface network addresses, subnet identifiers, subnet-to-subnet peering objects, security groups, network ACLs,...

MANAGED CONNECTIVITY BETWEEN CLOUD SERVICE EDGE LOCATIONS USED FOR LATENCY-SENSITIVE DISTRIBUTED APPLICATIONS

PRIORITY APPLICATION

This application is a continuation of U.S. patent application Ser. No. 17/809,864, filed Jun. 29, 2022, which is hereby incorporated by reference herein in its entirety.

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. 5G applications often require messages to be transmitted with very low latencies between application subcomponents.

BRIEF DESCRIPTION OF DRAWINGS

FIG. 7 illustrates example elements of networking metadata which may be provided from a control plane server to connectivity managers at edge locations of a virtualized computing service, according to at least some embodiments.

Figure 1:
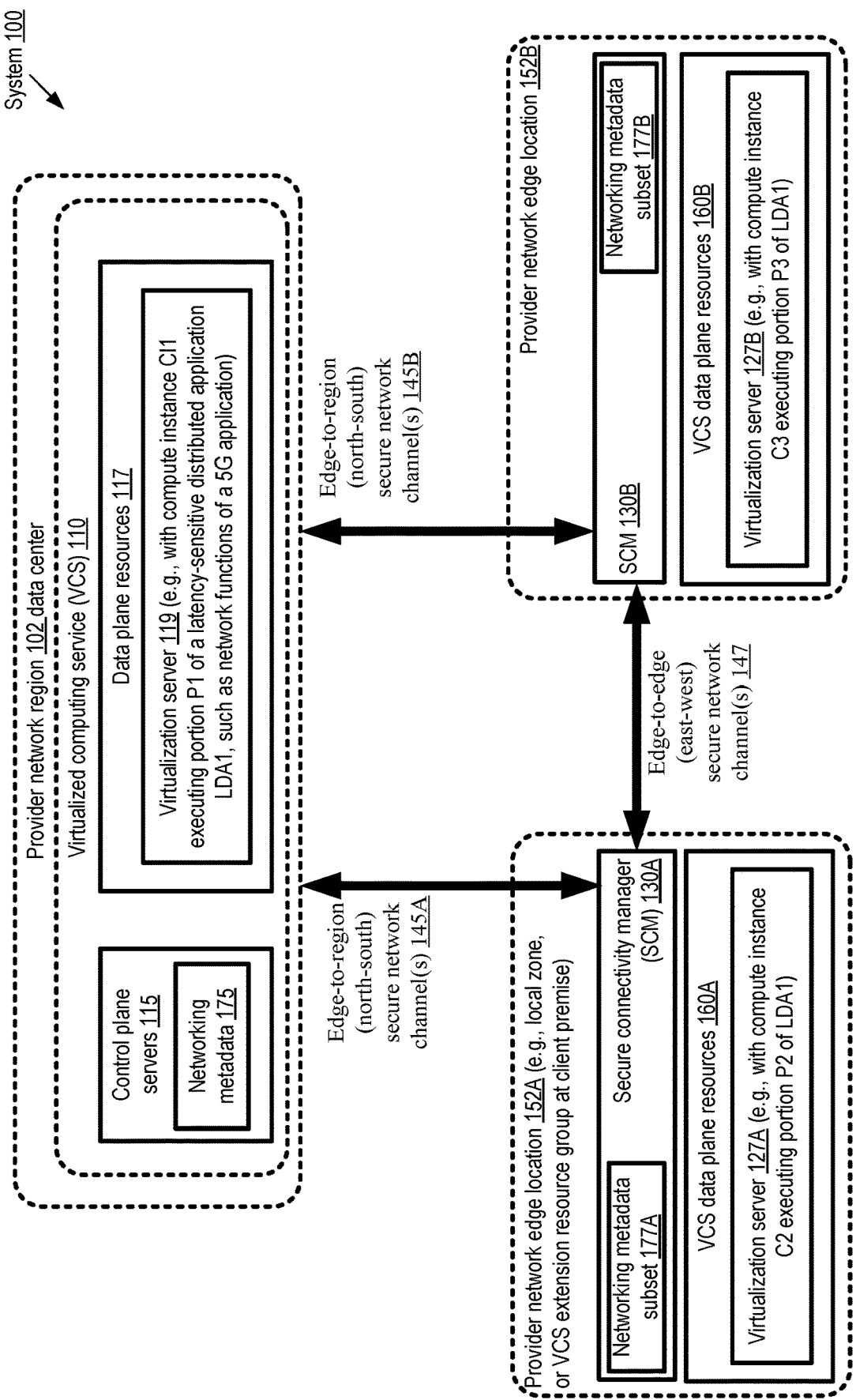
FIG. 1 illustrates an example system environment in which control plane servers of a virtualized computing service may distribute networking metadata that can be used to establish secure network channels between edge locations of a cloud provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for establishing secure low-latency connectivity, managed by a control plane of a virtualized computing service (VCS) of a cloud provider network, between edge locations at which respective portions of latency-sensitive applications (such as fifth-generation (5G) telecommunication applications) are run. The cloud provider network includes numerous regional resource collections, also referred to as regions, with each region including one or more data centers (typically located within the same geographical entity such as a state or province, or neighboring geographical entities) referred to as the primary data centers of the provider network. Control plane or administrative servers of the VCS can be located within the primary data centers, along with data plane resources of the VCS which are used for storing and processing some types of applications or application subcomponents of clients of the VCS. Subcomponents of clients' applications can be distributed among several premises or locations, including various types of edge locations and/or the primary data centers as well. An edge location, such as a premise owned or managed by a client of the VCS, is a premise external to primary data centers of any of the regions of the provider network to which provider network infrastructure including data plane components (such as virtualization servers) are deployed. Such edge infrastructure is typically managed by control plane servers in a nearby region. An edge location typically does not itself contain control plane servers of the VCS. Edge locations can be used to run application subcomponents that benefit from proximity to other resources, such as cell towers, Internet-of-Things devices, client-premise special purpose resources whose functionality cannot be easily replicated within the provider network, and the like. In order to enable control plane servers to manage data plane resources at edge locations, secure network channels are established by the provider network operator between the regional data centers and the edge locations. Such secure network channels are referred to as "edge-to-region" channels or "north-south" channels.

For some types of distributed applications which are partly or fully implemented at edge locations of a provider network, connectivity between different edge locations may not be required. For other types of distributed applications, connectivity may be required between respective portions of the distributed application which are implemented at respective edge locations, but the latency requirements for such connectivity may not be very strict. To accommodate such relaxed-latency communication, network pathways that use the north-south channels and use a regional data center as an intermediary can suffice. For example, a message can be sent from one program P1, implementing one portion of a distributed application D1 at an edge location E1 whose data plane resources are managed from a regional data center DC1, to another program P2, implementing another portion of D1 at an edge location E2, as follows. The message can be sent via a north-south channel from E1 to DC1. At DC1, a forwarding/routing intermediary such as a virtual traffic hub or transit gateway can send the message on to E2 via a second north-south channel that was set up between DC1 and E2.

For some latency sensitive distributed applications, such as various kinds of telecommunication or radio-based applications (RBAs), the latency requirements for messages transmitted between edge locations can be very strict. For example, some messages sent from a network function of a distributed unit (DU) of an RBA (implemented at one edge location) may have to reach a network function of a centralized unit (CU) of the RBA (implemented at a second edge location) within a very short time. To accommodate such strict latency requirements, control plane servers of the VCS can coordinate the establishment of more direct secure network channels between pairs of edge locations. Messages transferred via such channels, referred to as "edge-to-edge" channels or "east-west" channels, do not pass through regional data centers, and as a result can typically reach their intended destinations more quickly than if north-south channels were used. In order to facilitate the establishment of such east-west channels, the control plane servers can provide respective sets of networking metadata to secure connectivity managers (SCMs) at each edge location which is to be connected to another edge location. The networking metadata can for example include the network address of the peer SCM with which a channel is to be established, security artifacts such as cryptographic keys which can be used to authenticate the peer SCM, configuration settings pertaining to isolated virtual networks (IVNs) whose addresses are assigned to application subcomponents at the edge locations, and so on. The secure network channel established between peer SCMs at a pair of edge locations can comprise a tunnel (similar to a virtual private network or VPN tunnel) of an underlay network, over which messages can be transmitted from one application subcomponent to another using overlay network addresses assigned to the application subcomponents within the IVNs. The east-west channels can be referred to as "direct" edge-to-edge channels as they do not pass through provider network regions. The higher-latency pathways employing north-south channels can be used as backup pathways in the event that an east-to-west channel becomes unusable or fails.

In some cases, a client on whose behalf a latency sensitive application is run using VCS control plane-managed resources can specify the pairs of edge locations for which east-west channels should be set up. In other cases, if for example there are a large number of edge locations being used, and messages can be transmitted from a given edge location to peer application subcomponents at any of several other edge locations to accomplish the same application goal regardless of which specific other edge location is used, a different approach can be used. Instead of specifying the specific pairs of edge locations between which an east-west channel should be established, the client can simply specify performance requirements for messages between various types of application subcomponents, and the VCS control plane can use such requirements to choose the edge locations between which east-west channels should be set up. As and when configuration settings pertaining to the application components run at edge locations change (e.g., if the client submits a request to the VCS control plane to change security settings of an IVN whose compute instances are used for running portions of the distributed application, or change subnet configuration of an IVN), the changes can be propagated from the VCS control plane to the appropriate edge locations and used to direct subsequent messages of the application.

As one skilled in the art will appreciate in light of this disclosure, certain embodiments may be capable of achieving various advantages, including some or all of the following: (a) enabling faster performance for radio-based applications and other latency sensitive applications, at least some of whose components are run at edge locations of a provider network, (b) reducing the resource (e.g., bandwidth) requirements for network channels set up between edge locations and primary data centers of a provider network, and/or (c) enhancing the user experience of administrators of latency sensitive applications by reducing the amount of network configuration tasks (such as establishing custom edge-to-edge network paths that are not managed by the VCS control plane) that have to be performed by such administrators.

According to some embodiments, a system may include one or more control plane servers (CPSs) of a virtualized computing service (VCS) of a cloud provider network, a first secure connectivity manager (SCM) running at a first edge location of the cloud provider network, and a second SCM running at a second edge location of the cloud provider network. The cloud provider network may include a plurality of regions, with each region comprising one or more data centers. The CPSs may run at such data centers, while the edge locations may not include control CPSs in at least some embodiments. A CPS may determine, based at least in part on input received via a programmatic interface from a client of the VCS, that connectivity is to be established between a first portion of a distributed application (such as a first set of network functions of a radio-based application) and a second portion of the distributed application (such as a second set of network functions of the radio-based application). The first portion of the distributed application may be implemented, for example, at a first server managed at least partly by the VCS control plane and located at the first edge location, and the second portion may be implemented at least partly at a second server managed by the VCS control plane and located at the second edge premise. The respective portions of the distributed applications may, for example, comprise one or more programs running at primary processors such as CPUs of the servers in some cases, and/or may comprise operations performed at hardware accelerators attached to the servers. The CPS may transmit, to the first SCM, a set of networking metadata which includes at least a network address of the second SCM and a first set of security artifacts (e.g., including a cryptographic key and/or a digital certificate) in various embodiments. Similarly, in some embodiments, the CPS may also transmit another set of networking metadata to the second SCM, comprising the network address of the first SCM and a second set of security artifacts.

The first SCM may initiate, using the set of networking metadata, establishment of a secure network channel between the first SCM and the second SCM in at least some embodiments. For example, during the establishment of the channel, a message may be sent to the network address of the second SCM by the first SCM according to secure session establishment protocol, and a message may be received from the second SCM. The identity of the second SCM may be verified or authenticated using the first set of security artifacts by the first SCM in some embodiments. Data transferred via the secure network channel may not pass through any of the provider network's regions, including the region at which the CPS is located, in various embodiments. In some embodiments, the second SCM may initiate establishment of the channel, or both SCMs may attempt to establish the channel concurrently or near-concurrently using the respective networking metadata provided by the CPS to the SCMs. A message originating at the first server may be transmitted to the second server via the secure network channel in various embodiments. The message may comprise output of the first portion of the distributed application, and such output may be consumed as input by the second portion of the distributed application in some embodiments. For example, an output of a distributed unit (DU) network function of a radio-based application, running at a compute instance of the VCS at the first server at the first edge location, may be consumed as input by a network function of a centralized unit (CU) of the radio-based application which is run at another compute instance at the second server at the second edge location. In at least some embodiments, a virtualization management component of the VCS, running at the first server, may encapsulate the original message generated at the first portion of the distributed application using an encapsulation protocol of the VCS, and transmit the encapsulation message to a virtualization management component running at the second server by sending it over a secure tunnel (the secure network channel) established by the first SCM and the second SCM. The SCMs may include a message handler subcomponent (also referred to as a message route selector) in some embodiments, responsible for transmitting selected messages originating at the first edge location using the secure network channel, e.g., based on the destination addresses of the messages. Such a message handler may, for example, determine whether an edge-to-region channel should be used for a particular message, or whether an edge-to-edge channel should be used, and then initiate the transfer of the message via the selected channel. In some embodiments, multiple edge-to-edge secure channels may be established between one edge location EL1 and several other edge locations EL2, EL3, etc. For example an EL1-EL2 channel may be established, an EL1-EL3 channel may be established, and so on, depending on the needs of the applications being run at the edge locations. In some embodiments, the secure network channel established between a pair of edge locations may include a VPN tunnel, and a version of a VPN protocol may be used to transmit the message.

In some embodiments, a client of the VCS may submit a connectivity request to the VCS control plane via a programmatic interface, specifying or identifying the first and second edge locations between which connectivity is desired. The programmatic interface may comprise, for example, a web-based console, command-line tools, a set of APIs, and/or a graphical user interface. In other embodiments, a client may not necessarily specify both edge locations. Instead, for example, a CPS may obtain, via such a programmatic interface, a connectivity request indicating a performance requirement for messages of the distributed application that originate at a set of edge locations including the first edge location. In response to such a connectivity request, the CPS may select, from a plurality of locations at which portions of the distributed application are run, the second edge location as a location to which connectivity from the first edge location is to be established. The second edge location may be selected based at least in part on the performance requirement in such a scenario.

According to some embodiments, a VCS may be organized as a collection of isolated virtual networks (IVNs), with each IVN being set up at the request of a client. An IVN, also referred to as a virtual private cloud (VPC), may comprise a set of resources that is logically isolated or separated from the rest of the resources of the VCS with respect to at least some types of networking configuration settings. For example, a given IVN may have one or more subnets with respective security settings chosen by the client, and/or a set of Internet Protocol (IP) addresses chosen by the client and assigned to compute instances (such as virtual machines) or other entities configured within the IVN. In one such embodiment, a CPS may transmit configuration information of an IVN to the first SCM. The second portion of the distributed application may be implemented within the IVN, and the configuration information of the IVN may be utilized to transmit a message from the first portion of the distributed application to the second portion. The IVN configuration information may for example include (a) a subnet established within the IVN, (b) a subnet-to-subnet peering enablement object, (c) a security group indicating a restriction on inbound or outbound traffic, (d) a network access control list and/or (e) a route table entry. In at least some embodiments, if and when a client on whose behalf the IVN was established updates the configuration of the IVN, the updated configuration information may be propagated to the first SCM by the CPS, and used to transmit additional messages to the second portion of the distributed application. The IVN security-related configuration information may for example be used to determine whether transmission of a message is permitted from one compute instance (being used for one portion of the distributed application at one edge location) to another compute instance (being used for another portion of the distributed application at another edge location), which specific route table entry applies to the message, and so on. Subnet-to-subnet peering enablement objects may be used in some embodiments to verify whether messages from one subnet within which a portion of the distributed application is being run at one edge location can be sent to another subnet within which a different portion of the distributed application is being run at another edge location. The IVN networking information may refer to higher-level virtual constructs such as compute instances (virtual machines), virtual network interfaces programmatically attached to the compute instances, logical routes between the constructs, and so on, while the secure networking channels may be used to transmit the messages over physical network links in various embodiments.

In some embodiments at least some servers managed by the VCS control plane at the edge locations may comprise offloading cards. Such cards may comprise a set of processors and a memory, separate from the primary processors (e.g., CPUs) and main memory of the servers, and may be used to offload some types of tasks from the primary processors. The offloaded tasks may include, for example, virtualization management tasks, execution of network functions of radio-based applications, and/or the execution of SCMs. In some embodiments, at least a portion of a radio-based application whose messages are sent to another edge location using a secure network channel set up by an SCM may itself be implemented at a hardware network function accelerator (NFA) at such an offloading card. The NFA may be designed to execute certain network functions, e.g., functions at Layer 1 (L1) and/or Layer 2 (L2) of a radio-based technology stack very efficiently, and offloading the execution of those network functions to an NFA may help free up the primary processors of the servers for other tasks. In one embodiment, a server managed by the VCS control plane may include one or more NFAs incorporated within offloading cards that do not comprise virtualization management components. In some embodiments, more than one type of offloading card may be incorporated within a server—e.g., one offloading card that includes virtualization management components, another offloading card that comprises only NFAs but not virtualization management components, and so on. An offloading card may be linked to the primary processors of the server via peripheral interconnects such as PCIe (Peripheral Component Interconnect-Express), Universal Serial Bus (USB) or the like in different embodiments. Offloading cards may include accelerators for distributed applications subcomponents that are not radio-based in some embodiments—e.g., accelerators for certain types of machine learning applications may be used in some embodiments.

As mentioned above, edge-to-edge network channels managed by the VCS control plane can be used to implement part of the functionality of a variety of radio-based or telecommunication applications (e.g., various types of broadband cellular applications such as private 5G (fifth generation) networks, IoT (Internet of Things)-based applications, public 5G applications and the like in some embodiments. Various types of network functions of such applications may be run at edge locations in different embodiments. A network function is a functional building block within a network infrastructure, which has well-defined external interfaces and a well-defined functional behavior. Network functions can be chained together to form communications services. Network functions have historically been implemented as a physical network appliance or node; however network functions can be virtualized as well. The core and RAN (radio access network) network functions referenced herein can be based at least partly on the 3rd Generation Partnership Project (3GPP) specifications, European Telecommunications Standards Institute (ETSI) specifications, and/or other wireless communications standards in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, both core and RAN network functions can additionally or alternatively be run on a virtualization server of a cloud provider, for example a server provisioned to a customer to implement a private 5G network, or used by a wireless service provider or the cloud provider to create a public 5G network. The term "radio-based application" (RBA) is used herein to refer to applications in which at least some messages are transmitted using radio frequency signals and associated antennas, such as those used for various generations (4G, 5G and the like) of cellular broadband technologies. The virtualization servers used for DU or CU network functions of RBAs can be referred to as RAN pipeline processing servers, RAN servers, RAN application servers, or as radio-based application servers. Note that the techniques described herein are not limited to any particular type of distributed application; furthermore, the radio-based applications described herein as examples of such distributed applications are not limited to any particular generation of cellular broadband, nor are they limited to utilizing any particular portion of the electromagnetic spectrum for message transmissions.

In some embodiments, a virtualization server (VS) being used to run DU or CU network functions may be set up as part of an extension resource group (ERG) of the cloud provider network configured at an edge location such as a premise owned by a client of the provider network. An ERG may be located, for example, in the vicinity of to a set of cell towers or antennas, in response to requests from VCS clients wishing to run radio-based applications on resources managed by the VCS control plane. In other embodiments, VSs may be set up at local zones, third-party data centers or at the data centers of the provider network. A given ERG may share some administrative resources among its member servers in some embodiment, such as a local agent of the VCS control plane and/or a secure connectivity manager (SCM) implemented using some combination of hardware and software. In at least some embodiments, the servers used for ERGs may be configured by the provider network operator with the appropriate hardware (e.g., including network function accelerator (NFA) cards), software and firmware and then shipped to the premises where the ERGs are utilized. In some embodiments, at least some of the servers such as VSs may require relatively little physical space (e.g., some VSs supplied by the provider network operator may only take up one rack unit (1 U) or a small number of rack units in a standard data center rack). The VSs set up as part of ERGs or run at edge locations may comprise a number of hardware, software and/or firmware elements that are especially designed to enable remotely generated virtualization-related administrative commands to be executed in a safe and secure manner, without for example requiring messages to be sent back to the sources from which the command were originally issued. In some embodiments, such elements may include trusted platform modules (TPMs) or other security modules incorporated within offloading cards, tamper-resistant storage devices whose contents can only be decrypted as long as the storage devices are physically attached to a particular VS and so on. In at least some embodiments, such a VS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within a VS itself.

In some embodiments, a secure north-south or edge-to-region network channel, such as a virtual private network (VPN) tunnel or VPN connection, may be established between a VS (running at a premise external to the provider network data centers) and resources located within the provider network data centers, and such a channel may be employed for sending commands from the VCS control plane to the VS. For example, respective one way secure network channels may be used to transmit commands originally generated at the control plane servers in response to client requests (including requests to launch compute instances) for eventual execution at an VS. In one embodiment, a secure channel to be used for such commands may be set up between one or more resources at a VS (such as an SCM) and one or more resources within an isolated virtual network (IVN) of the client at whose request a compute instance used for a network function is to be launched at the VS.

A VS can serve as a source or destination of several different types of network traffic, including traffic between different layers of a radio-based technology stack being used for RBAs, traffic to and from other resources within the provider network, traffic to and from resources in client networks established at client premises, traffic to and from the public Internet, and so on. A given VS can be equipped with several different kinds of networking hardware devices (NHDs) that can be employed for the network traffic, including for example default network interface cards, networking chipsets within network function accelerators (NFAs), networking chipsets within virtualization management offloading cards, and so on. Any combination of one or more of the NHDs may be used for the east-west or edge-to-edge channels introduced above. Network management logic provided by the provider network can be used to intelligently select the most appropriate NHD to be used for a given category of traffic of a VS during a given time interval, thus enabling the best use of the available networking resources of the VS to achieve quality of service targets of the applications being run at the VS. For example, depending on the types of RBAs being run, a different NHD can be used for front-haul traffic of the radio-based applications than is used for mid-haul traffic for at least some time periods. Software programs (e.g., programs developed by third-party vendors or by the provider network operator) which implement part of an RBA can be run within runtime environments (RTEs) such as radio-optimized compute instances or radio-optimized software containers at a VS. In some embodiments, a given VS or a given NFA may be employed for several different RBAs or pipelines, e.g., on behalf of a single client of the provider network or on behalf of different clients. As a result of such multi-tenancy, the overall amount of computing resources and/or power consumed for implementation of several different RBAs can be reduced substantially. The reduction in the resources used, which can translate into lower costs, in turn enables new entrants into the radio-based application space, and the design of new types of applications.

According to some embodiments, a provider network may comprise a radio-based application management service (RBAMS) which implements programmatic interfaces pertaining to the configuration of RBA network functions. An indication of an expected geographical distribution of end-user requests (e.g., cell phone calls, text messages, IoT sensor inbound and outbound messages, etc.) of a radio-based application may be obtained at the RBAMS via such programmatic interfaces. The information about the geographical distribution may be used at the RBAMS to select or recommend one or more edge locations or other premises at which ERGs and/or VSs of one or more categories supported by the provider network should be configured for the client. If the client indicates an approval of the recommendations, one or more VSs may be configured on behalf of the client at such premises and assigned to the clients' applications by the RBMAS in such embodiments. The premises may include, for example, a point-of-presence site of the provider network, a local zone premise of the provider network, or a client-owned premise.

In at least some embodiments, a variety of metrics may be collected (e.g., by control plane servers of a VCS or the RBAMS) from various subcomponents of RBAs and provided to clients via programmatic interfaces if desired; such metrics may include inbound or outbound message transfer counts or message transfer rates, utilization levels of the local processors, memory and other resources of the NFAs, and so on in different embodiments.

As mentioned above, subcomponents of various kinds of latency-sensitive applications including RBAs may be executed at least in part using resources whose connectivity is managed from control plane servers of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A given cloud provider network can be formed as a number of regions, as indicated above, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as a VCS extension resource group. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone within a region. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a VCS, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a VCS or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, NFAs or other accelerators), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Components of latency-sensitive distributed applications, such as DU and CU network functions, may be run using containers at edge locations and/or within region data centers in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which control plane servers of a virtualized computing service may distribute networking metadata that can be used to establish secure network channels between edge locations of a cloud provider network, according to at least some embodiments. As shown, system 100 comprises a provider network region 102 data center, within which a set of control plane servers 115 and data plane resources 117 of a virtualized computing service (VCS) 110 are located. The control plane servers 115 may perform various types of administrative tasks pertaining to VCS data plane resources 117, as well as administrative tasks pertaining to VCS data plane resources 160A and 160B at provider network edge locations 152A and 152B respectively.

The data plane resources 117 at the provider network region may include a virtualization server 119 in the depicted embodiment, at which a compute instance CI1 may be launched in response to a programmatic request received at a control plane server 115 from a client of the VCS. CI1 may for example be used to run a portion P1 of a latency-sensitive distributed application LDA1, such as a set of network functions of a 5G radio-based application (RBA). The VCS data plane resources 160A at edge location 152A may include another virtualization server 127A, at which a compute instance CI2 may be launched in response to another programmatic request from the VCS client. CI2 may be launched to run another portion P2 of LDA1. Edge location 152B's VCS data plane resources 160B may include a third virtualization server 127B, at which a third compute instance CI3 may be launched at the request of the client. The edge locations 152A and/or 152B may be local zones, premises owned/managed by VCS clients, or other types of edge locations; neither edge location 152 nor edge location 152B may include control plane servers of the VCS in the depicted embodiment.

Control signals originating at the control plane servers 115, used to perform various administrative tasks (such as launching or terminating compute instances) at the data plane resources 160 (160A or 160B) may be sent via edge-to-region (north-south) secure network channels 145A and 145B. In at least some embodiments, a secure connectivity manager (SCM) 130A at edge location 152A may participate in the establishment of an edge-to-region channel 145A with a control plane server 115, and another SCM 130B at edge location 152B may participate in the establishment of an edge-to-region channel 145B with a control plane server 115. SCMs may also be referred to as networking managers in some embodiments, and may themselves comprise a combination of software and/or hardware of one or more computing devices. The edge-to-region secure network channels may be utilized not only for administrative commands flowing from the control plane servers to the edge locations, but also for data plane traffic between VCS data plane resources 160A and data plane resources 117, and/or data plane traffic between VCS data plane resources 160B and data plane resources 117 in the depicted embodiment.

The LDA1 components running at the edge location 152A may need to send messages to (and/or receive messages from) LDA1 components running at edge location 152B. The control plane servers may determine that network connectivity to enable such messages to be sent with low latencies is needed based on one or more types of programmatic requests from VCS clients in different embodiments. For example, a VCS client may specify the edge locations (e.g., 152A and 152B) between which low-latency traffic is to be supported in some embodiments. In other embodiments, a client may specify one edge location (such as 152A) at which a certain type of subcomponent of LDA1 runs, and performance requirements for the traffic between that type of subcomponent and another type of subcomponent. If there are several different edge locations at which respective logically equivalent replicas or copies the other types of subcomponent run, and the distributed application LDA1 is structured in such a way that any of those edge locations can be used for handling traffic from the first edge location, the VCS control plane may select a particular edge location (such as 152B) to which direct connectivity from the first edge location should be established.

After a control plane server determines that secure connectivity for low latency messages is to be established between a particular pair of edge locations such as 152A and 152B, in various embodiments a control plane server 115 (or a set of such servers) may provide an SCM such as 130A at edge location 152A with networking metadata that can be used to establish an edge-to-edge (east west) secure network channel 147 between SCM 130A and SCM 130B. The control plane servers 115 may in general have access to a large amount of VCS networking metadata 175, including for example mappings between physical or substrate network addresses (assigned to virtualization servers) and virtual network interface addresses which are assigned to compute instances, configuration information of isolated virtual networks set up on behalf of VCS clients, and so on. In response to determining that connectivity is to be established between edge locations 152A and 152B, control plane servers 115 may send a first subset 177A of the network metadata to SCM 130A, and a second subset 177B of the networking metadata to SCM 177B. The subset 177A may include, among other elements, a network address of SCM 130B, as well as a set of security artifacts that can be used to verify the identity of SCM 130B in some embodiments. Similarly, in some such embodiments, subset 177B may include a network address of SCM 130A, as well as a set of security artifacts that can be used to verify the identity of SCM 130A. In one embodiment, networking metadata that is sufficient to establish the edge-to-edge secure network channel 147 may only be sent to one of the SCMs 130A and 130B.

Using the provided networking metadata subset(s), SCMs 130A and 130B may establish the edge-to-edge secure network channel 147 in the depicted embodiment. The channel establishment procedure may be initiated by either (or both) of the SCMs, depending on the networking protocol being used. In some embodiments a variant of a virtual private network (VPN) protocol may be used, and one or more VPN tunnels may be established between the two SCMs. Other protocols may be used in other embodiments. When a message from an LDA1 component is to be sent from edge location 152A to edge location 152B, it may be sent in accordance with the protocol by the sending-side SCM in various embodiments. For example, in a scenario in which portion P2 of LDA1 comprises one set of network functions of an RBA (such as a DU network function) and portion P3 comprises another set of network functions (such as a CU network function) of the RBA, a message from a virtualization server 127A at edge location 152A to virtualization server 127B at edge location 152B may comprise output of one network function run at virtualization server 127A. The output, when obtained at the virtualization server 127B via the secure network channel, may be consumed as input by another network function run at virtualization server 127B. Note that the portions P2 and P3 of LDA1 may also communicate with LDA1 portions that are not run at edge locations; P2 or P3 may communicate with LDA portion P1 at the region 102 data center via edge-to-region secure network channels as and when required.

As indicated in FIG. 1, the edge-to-edge secure network channel may not pass through the provider network region 102 in the depicted embodiment, and may therefore support lower message latencies that pathways which include resources within the region. If the distance between the edge locations 152A and 152B happens to be smaller than the distances between either edge location and the region data centers, the time taken for messages sent via the edge-to-edge secure network channel may at least in some cases be much shorter than the time it would take to send the messages from one edge location to another via the region.

In various embodiments, components of LDA1 that run at one or more of the edge locations 152 may be configured within isolated virtual networks (IVNs) set up at the VCS on behalf of the VCS client. Networking metadata pertaining to such an IVN may for example comprise one or more subnets, addresses within the subnets which are assigned to virtual network interfaces of compute instances at which the LDA1 components are run, security rules or security groups indicating restrictions on sources/destinations of traffic of a given compute instance, route table entries to be used to route messages from one range of addresses to another, and so on. In at least some embodiments, the networking metadata subset propagated to a given edge location by a control plane server may include IVN configuration information pertaining to the other edge location with which an edge-to-edge channel has been established. For example, edge location 152A may be provided IVN configuration settings pertaining to data plane resources at edge location 152B, and edge location 152B may be provided IVN configuration settings pertaining to data plane resources at edge location 152B. Such information may be utilized when sending messages from one edge location to another, e.g., by the SCMs and/or by virtualization management components at virtualization servers—for example, before sending a message to a compute instance, a virtualization management component or an SCM may verify that sending the message would not violate an applicable IVN security setting. Note that a VCS client may modify the configuration settings of an IVN as and when desired, e.g., by submitting a programmatic request to the VCS control plane. In various embodiments, such updates or modifications may be propagated automatically by the VCS control plane to the relevant edge locations, and the updated information may be used at the edge locations to transmit subsequent messages between the components of LDA1.

Figure 2:
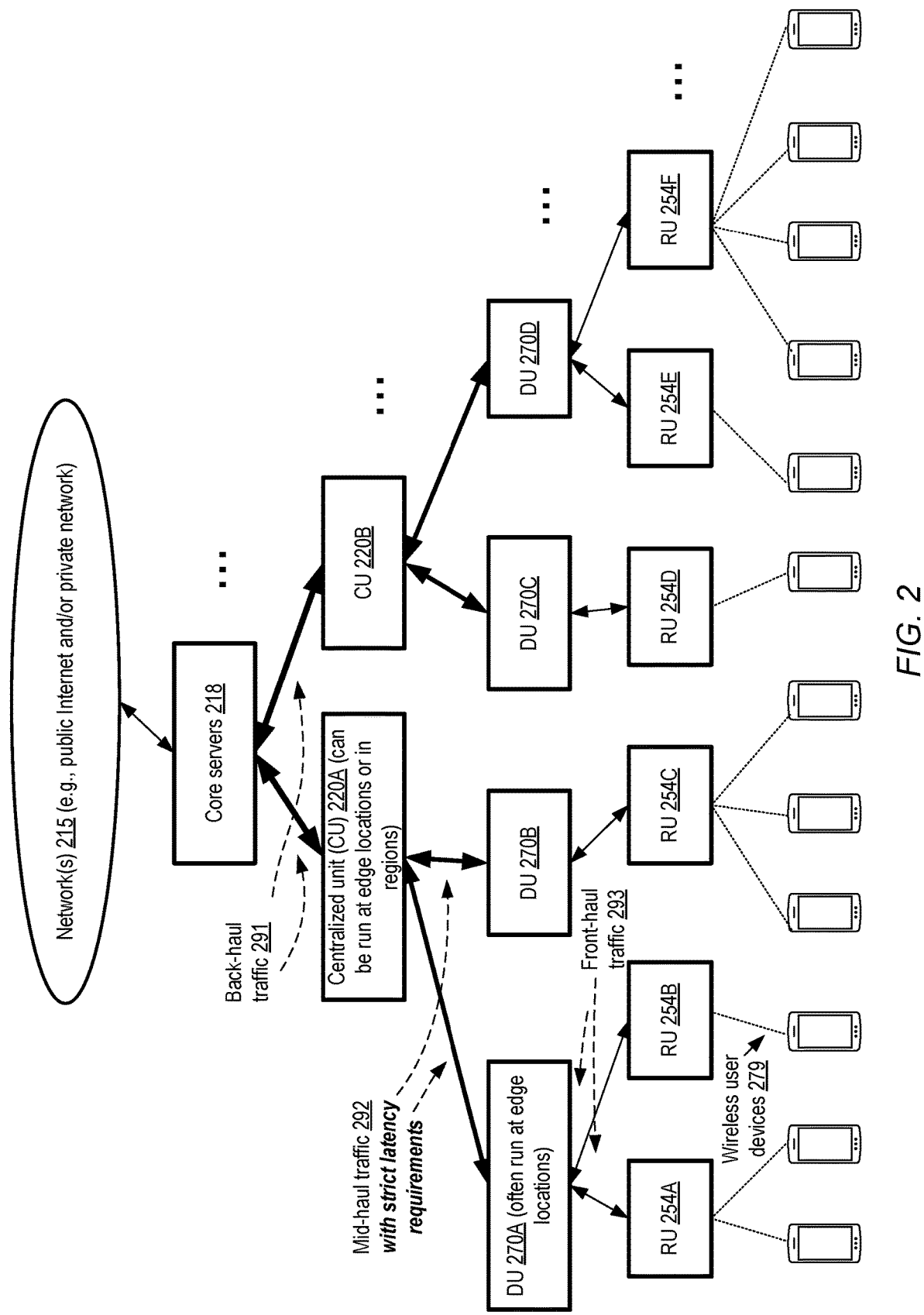
FIG. 2 illustrates an overview of layers of radio access network (RAN) nodes of radio-based applications which may require messages to be transmitted from one edge location of a provider network to another, according to at least some embodiments.

As discussed above, in some cases edge-to-edge network channels may be set up to help support message latencies required by radio-based applications. FIG. 2 illustrates an overview of layers of radio access network (RAN) nodes of radio-based applications which may require messages to be transmitted from one edge location of a provider network to another, according to at least some embodiments. A given RAN node such as a gNodeB may comprise at least one CU, at least one DU and at least one RU in some embodiments. A RAN of a radio-based application may comprise one or more RAN nodes in various embodiments. Different generations of radio-based technologies (such as fourth-generation or 4G, 5G, etc.) can comprise respective implementations of RANs and RAN nodes, sometimes with different names for the RAN nodes—for example, a 4G/LTE (Long Term Evolution) RAN node can be referred to as an eNodeB.

In the depicted embodiment, core servers 218, linked to one or more networks 215 used to transfer Internet Protocol packets comprising the payloads and control signals of radio-based applications over large distances, may implement a set of back-end functions associated with radio-based applications, enabling different sub-networks of the overall system to communicate with one another. Network functions performed at the core servers (referred to as core network functions) may for example include functions to aggregate data traffic from end user devices, authenticate subscribers, apply personalized policies, and/or manage the mobility of devices prior to routing traffic to operator services or the Internet. A given core server 218 may, for example, be implemented using resources (such as a virtualization server) at a provider network region data center in one embodiment. The core server may be connected to one or more centralized units (CUs), such as CU 220A and CU 220B. The traffic between the core servers 218 and the CUs 220 may be referred to as back-haul traffic 291 of the RBA. A virtualization server at which a CU is implemented may, for example, be located within an edge location at which one or more VCS extension resource groups are located, at a premise which is located close to such extension premises, or at a primary data center of the provider network.

In the embodiment depicted in FIG. 2 a given CU 220 may be linked to (and manager various tasks associated with) one or more distributed units (DUs) 270 of the RBA. For example, CU 220A may be connected to DU 270A and DU 270B, while CU 220B may be linked to DU 270C and DU 270D. DUs may often be run at edge locations. The traffic between CUs and DUs may be referred to as mid-haul traffic 292 in various embodiments, and may have fairly strict latency requirements—e.g., messages sent by DUs to CUs may have to be processed within a very short time from the time that they are sent, and/or messages sent from CUs to DUs may have to be processed within a very short time. Each of the DUs in turn may be linked with radio units (RUs) 254 associated with one or more cells of a cellular network in the depicted embodiment. For example, DU 270A may be linked to RUs 254A and 254B, DU 270B may be linked to RU 254C, DU 270C may be linked to RU 254D, and DU 270D may be linked to RUs 254E and 254F. The traffic between DUs and RUs may be referred to as front-haul traffic 293. Each of the RUs may be associated with one or more antennas which can be used to receive and transmit radio frequency signals from a variety of wireless user devices 279. In some embodiments, DUs, CUs and core networks may all be implemented at least in part using provider network resources. In one embodiment, at least some of the functionality of the RUs 254 may also be implemented using provider network resources. In various embodiments, to help provide the low latencies required for mid-haul traffic between some DUs and some CUs, edge-to-edge network channels of the kind introduced above, may be established with the help of the control plane servers of a VCS.

Figure 3:
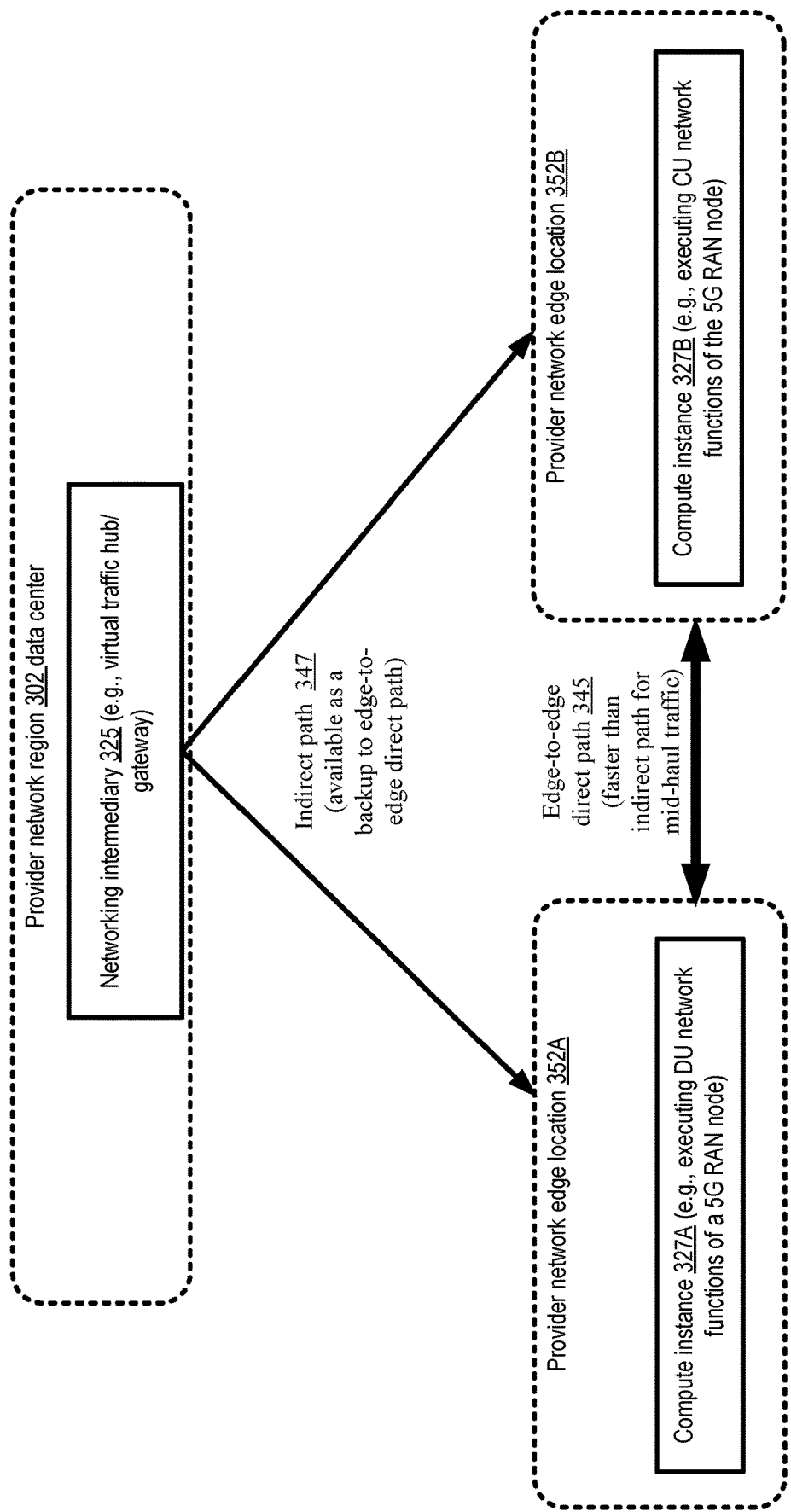
FIG. 3 illustrates example alternate pathways for messages transmitted between edge locations of a provider network, according to at least some embodiments.

FIG. 3 illustrates example alternate pathways for messages transmitted between edge locations of a provider network, according to at least some embodiments. In the embodiment shown in FIG. 3, an edge-to-edge direct path 345 comprising a secure network channel has been established for messages between provider network edge locations 352A and 352B, e.g., by respective secure connectivity managers at the two edge locations using metadata provided by control plane servers as described above. Compute instance 327A which may for example execute DU network functions of a 5G RAN node runs at edge location 352A, while compute instance 327B which may execute CU network functions of the same 5G RAN node runs at edge location 352B. Messages between the compute instances 327A and 327B, e.g., comprising inputs and/or outputs of DU and CU network functions, may be transmitted preferably via edge-to-edge path 345.

In the embodiment depicted in FIG. 3, an indirect path 347 may also be available for messages transmitted between compute instances 327A and 327B and may be used under certain conditions. The indirect path may typically be slower than the direct path, as the indirect path may involve transmission of messages from one edge location using an edge-to-region channel to a networking intermediary 325 (such as a virtual traffic hub or gateway) at a provider network region 302 data center, and from the networking intermediary 325 to the other edge location via another edge-to-region channel. The indirect path may for example serve as a backup for the direct path, used primarily when a problem such as a failure associated with the direct path is identified. Secure connectivity managers (SCMs) at each edge location may have networking metadata (such as an address of a networking intermediary 325, an address of a secure connectivity manager at the other edge location to which a message is to be directed, performance or availability information pertaining to edge-to-edge channels as well as edge-to-region channels) that allows the SCMs to choose the most efficient path for a given message in some embodiments. In at least some embodiments, control plane servers of the VCS may collect and provide performance or availability/failure information pertaining to edge-to-edge channels, edge-to-network channels, SCMs at other edge locations, etc. periodically to each of the SCMs, enabling an SCM to select the fastest paths for each message or message flow directed to another edge location.

In one embodiment, a chain comprising a plurality of edge-to-edge direct paths may be used to transmit a message from one edge location to another. For example, consider a scenario in which respective sets of network functions of an RBA are run at edge locations E1, E2 and E3, and respective edge-to-edge secure network channels have been established between E1 and E2, between E2 and E3, and between E1 and E3. If a message is to be sent from E1 to E3 and the direct path between E1 and E3 is unavailable for some reason, an SCM at E1 may send the message to E2 (using the channel from E1 to E2), requesting the SCM at E2 to forward the message to E3 via the E2 to E3 channel. Such a decision to request forwarding from an edge location may be taken, for example, if the performance information available at E1's SCM indicates that the E1-to-E2-to-E3 path is likely to be faster than a path via a region data center.

Figure 4:
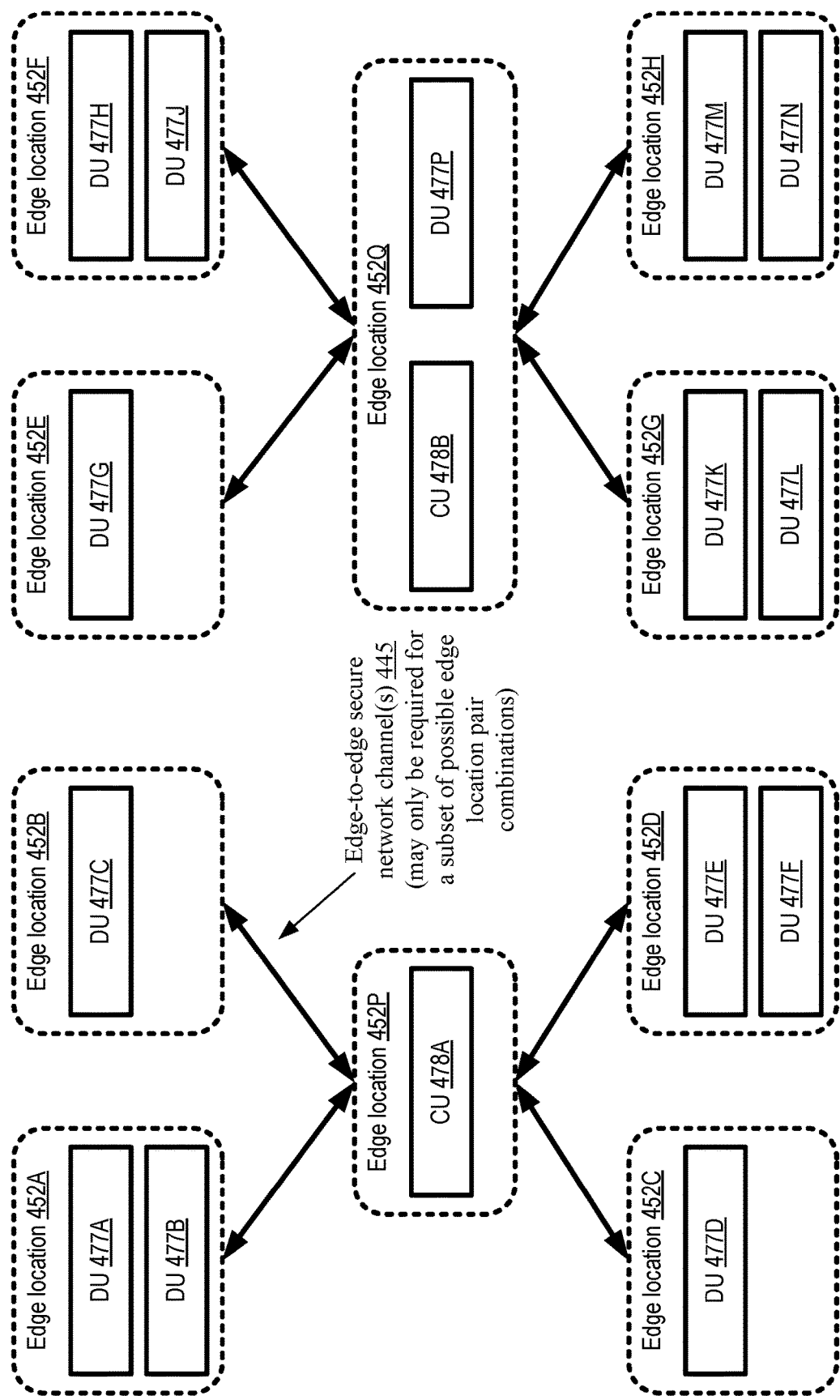
FIG. 4 illustrates an example scenario in which edge-to-edge network channels may be required for only a subset of edge location pairs of a provider network, according to at least some embodiments.

FIG. 4 illustrates an example scenario in which edge-to-edge network channels may be required for only a subset of edge location pairs of a provider network, according to at least some embodiments. In the depicted embodiment, network functions of a radio-based application may be distributed among at least ten edge locations of a provider network. DUs 477A and 477B may run at edge location 452A, and may need to communicate with CU 478A running at edge location 452P. DUs 477A and 477B may not need to communicate with any other CUs, such as CU 478B at edge location 452Q. Similarly, DU 477C running at edge location 452B, DU 477D running at edge location 452C, and DUs 477E and 477F running at edge location 452D may need to communicate with CU 478A but not with any other CUs. In contrast, DU 477G running at edge location 452E, DUs 477H and 477J at edge location 452F, DUs 477K and 477L running at edge location 452G, DUs 477M and 477N running at edge location 452H, as well as DU 477P running at edge location 452Q may all need to communicate with CU 478B but not with CU 478A.

Given that not all DUs need to communicate with all CUs, a relatively small set of edge-to-edge secure network channels 445 may be needed to satisfy the RBA's requirements in the depicted scenario. For example, such channels may be set up, with the help of the VCS control plane servers, between edge location pairs (452A, 452P), (452B, 452P), (452C, 452P), (452D, 452P), (452E, 452Q), (452F, 452Q), (452G, 452Q), and (452H, 452Q), but not between other possible pairs such as (452A, 452B) or (452Q, 452P). In some embodiments, a representation of DU-CU connectivity requirements such as those indicated above, similar to the tree or hierarchy shown in FIG. 2, may be provided to control plane servers of a VCS, and used by the VCS to determine which subset of networking metadata should be provided to any given SCM at an edge location to enable the establishment of the required set of edge-to-edge channels. In some deployments of RBAs and other distributed applications, hundreds or even thousands of edge locations may be used. Restricting the establishment of edge-to-edge channels to only those pairs of edge locations which require edge-to-edge connectivity may help avoid application errors and reduce the amount of networking and other resources used for the distributed applications. In at least some embodiments, a VCS client may use IVN security groups or other security-related rules to ensure that a given distributed application component can only communicate with the desired subset of other components of the application, as per the intended topology of the application. For example, security groups may be used to ensure that messages from compute instances (running DUs) at edge location 452G cannot be sent to a compute instance running CU 478A at edge location 452P. Such security settings may be propagated from the VCS control plane to the network management components (such as SCMs) at the edge locations, and enforced by the network management components.

Figure 5:
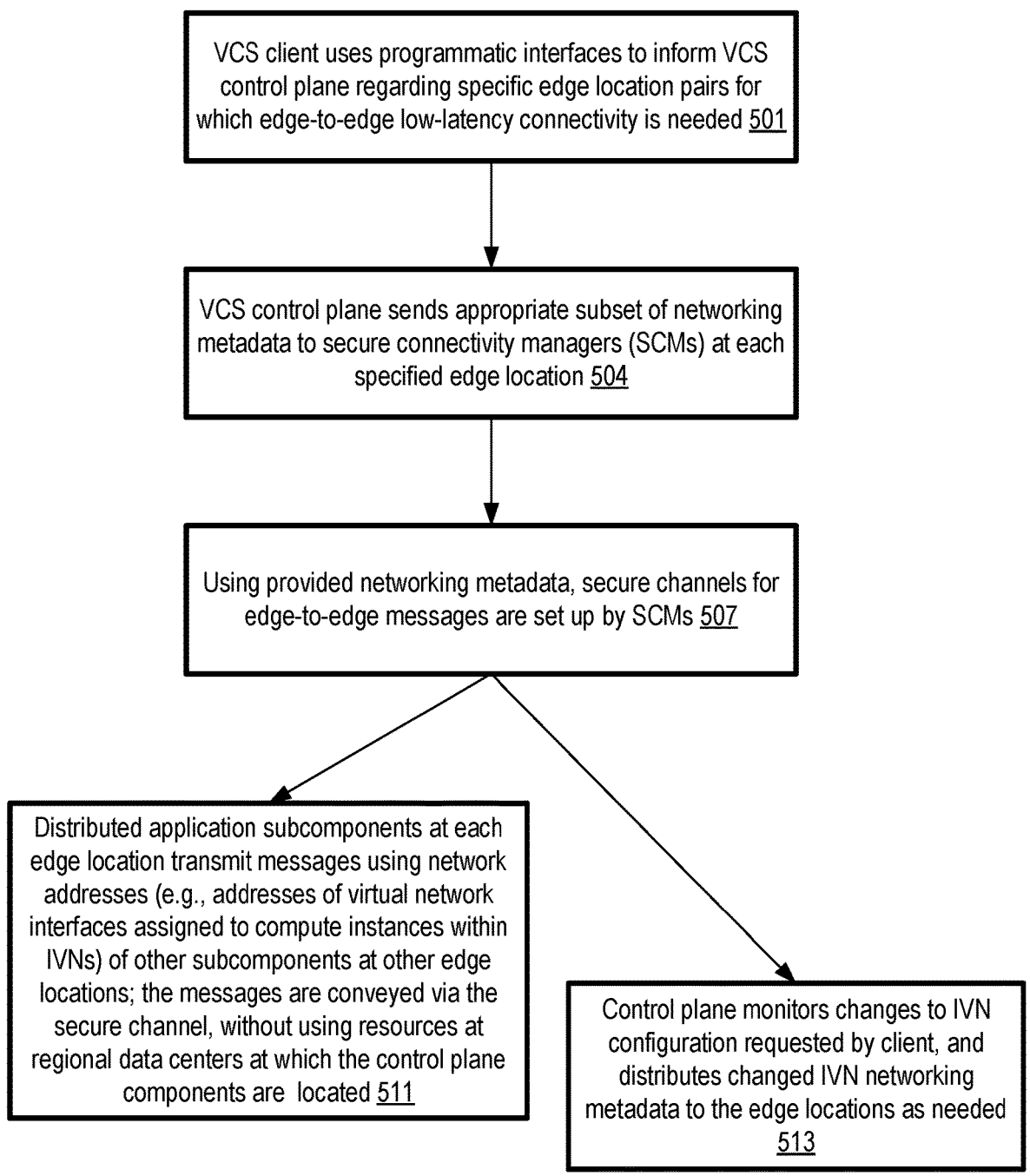
FIG. 5 is a flow diagram illustrating aspects of operations that may be performed in scenarios in which a client of a virtualized computing service specifies edge location pairs for which edge-to-edge connectivity is to be established, according to at least some embodiments.

FIG. 5 is a flow diagram illustrating aspects of operations that may be performed in scenarios in which a client of a virtualized computing service specifies edge location pairs for which edge-to-edge connectivity is to be established, according to at least some embodiments. As shown in element 501, a VCS client may utilize one or more programmatic interfaces of the VCS control plane to inform the VCS control plane regarding specific pairs of edge locations for which edge-to-edge low latency connectivity is desired. In some embodiments, such information may be provided in a connectivity request submitted to the VCS control plane via an interface such as a web-based console, a command-line tool, a graphical user interface or an application programming interface.

Based on the information provided by the client, a VCS control plane server may identify the subset of VCS networking metadata that is to be supplied to each edge location, and send that subset to secure connectivity managers (SCMs) at each specified edge location in the depicted embodiment (element 504). The metadata may include, for example, network addresses of the SCMs, security artifacts such as digital certificates and cryptographic keys that can be used to verify by one SCM that another SCM is a trusted entity, and so on.

Using at least the metadata provided by the control plane server, the SCMs of an edge location pair may establish a secure network channel between themselves for edge-to-edge message transmission in the depicted embodiment (element 507). For example, one of the SCMs may start a workflow for establishing a networking tunnel in accordance with a VPN protocol or some other protocol, and the other SCM may participate in the protocol. The secure network channel may not pass through, or utilize resources located at, a data center within a region of the provider network in at least some embodiments.

In various embodiments, after a secure channel is established between a pair of SCMs at respective edge locations, contents of messages originating at a server at one edge location of the pair may be transferred via the channel to another server at the other edge location of the pair. As shown in element 511, distributed application subcomponents (such as DUs or CUs) at each edge location may transmit messages using network addresses of other subcomponents at another edge location connected via a secure channel in the depicted embodiment. Some distributed application subcomponents may be run within compute instances run at respective virtualization servers, and IP (Internet Protocol) addresses assigned by the VCS control plane to virtual network interfaces that are programmatically attached to the compute instances may be used as the source and destination addresses of the messages in some embodiments. Such IP addresses may, for example, belong to a subnet defined by a VCS client within an isolated virtual network (IVN) set up for the client by the VCS control plane. In at least some embodiments, configuration information of the IVN, such as the subnets and security rules, may be provided to the edge locations (e.g., to the SCMs and/or to other networking management components running at the edge locations) by the VCS control plane servers, and used by the distributed application components to prepare their messages. In various embodiments, the SCMs and/or the other networking management components may cause the messages to be sent via the secure channels, without using resources at the regional data centers where the control plane servers of the VCS are located.

The VCS control plane servers may monitor changes to IVN configurations requested by the VCS client in various embodiments, and distribute the changed IVN networking metadata to the appropriate edge locations as needed (element 513) in the depicted embodiment. The updated metadata may subsequently be used to transmit additional messages using the edge-to-edge channels.

Figure 6:
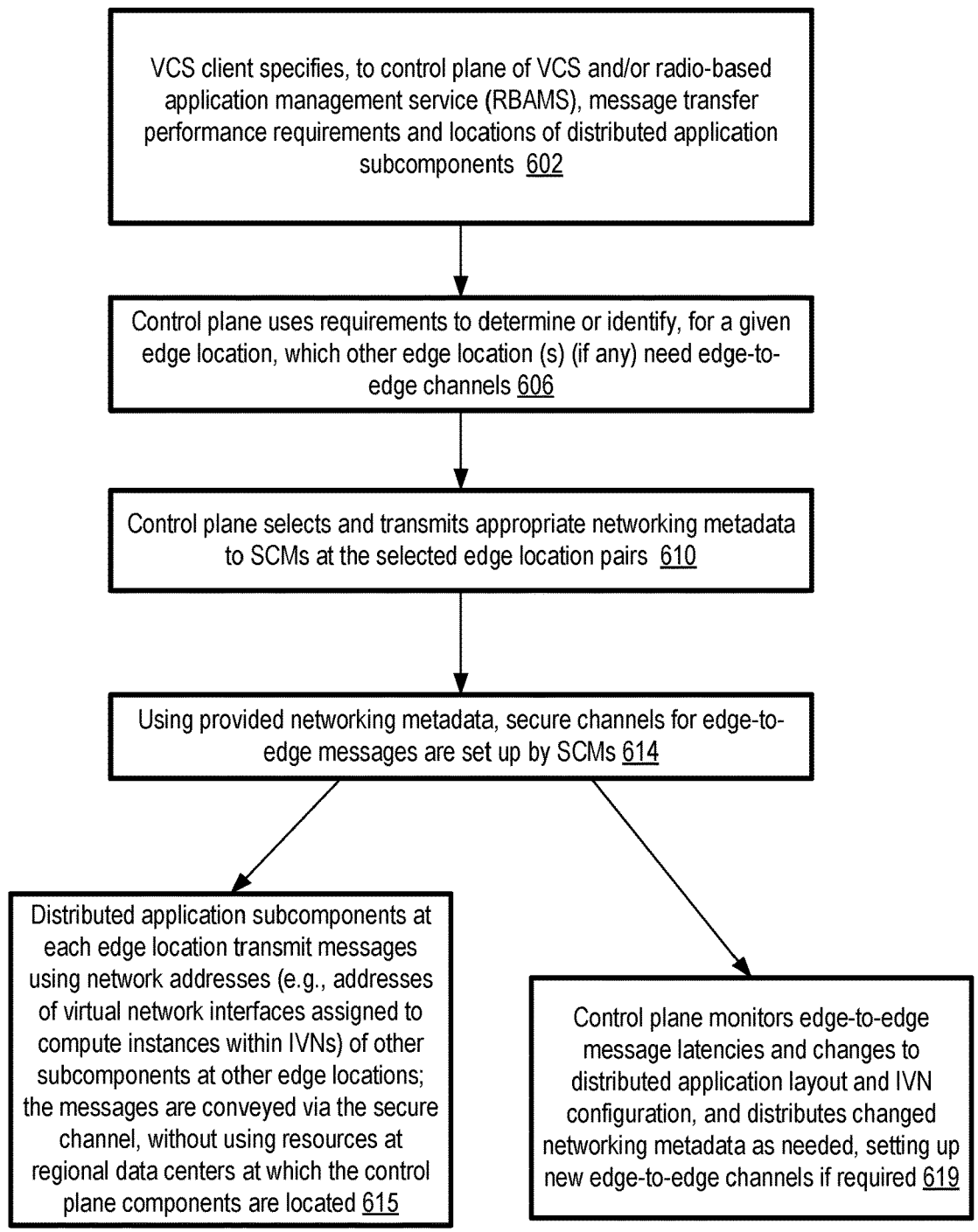
FIG. 6 is a flow diagram illustrating aspects of operations that may be performed in scenarios in which a client of a virtualized computing service provides application requirements information enabling the service to choose edge location pairs for which edge-to-edge connectivity is to be established, according to at least some embodiments.

FIG. 6 is a flow diagram illustrating aspects of operations that may be performed in scenarios in which a client of a virtualized computing service provides application requirements information enabling the service to choose edge location pairs for which edge-to-edge connectivity is to be established, according to at least some embodiments. As shown in element 602, a VCS client may specify, to a control plane server of a VCS or a radio-based application management service (RBAMS) implemented at a cloud provider network, message transfer (e.g., latency) requirements pertaining to various subcomponents or portions of a distributed application, as well as locations (edge locations, regional data centers, etc.) at which the different subcomponents are executed. A representation of a topology or layout of the application subcomponents may be provided in some embodiments by the client, along with performance requirements. In some cases, the VCS client may indicate at least one edge location with which an edge-to-edge channel should be established, without specifying the other edge location with which the channel is to be established.

The control plane server may use the requirements to determine, for a given edge location at which one or more subcomponents is executed, which other edge locations (if any) currently (given the current layout of the application subcomponents) require edge-to-edge network channels in the depicted embodiment (element 606). The control plane server may select, from a repository of networking metadata to which the control plane server has access, a respective subset of metadata to be provided to respective secure connectivity managers (SCMs) at the selected edge location pairs in some embodiments. The appropriate networking metadata subset may be sent to the SCMs (element 610).

Using the provided metadata, secure edge-to-edge networking channels may be set up by the SCMs (element 614) in the depicted embodiment. As shown in element 615, distributed application subcomponents (such as DUs or CUs) at some or all of the edge locations may transmit messages using network addresses of other subcomponents at another edge location connected via a secure channel in the depicted embodiment. Some distributed application subcomponents may be run within compute instances run at respective virtualization servers, and IP (Internet Protocol) addresses assigned by the VCS control plane to virtual network interfaces that are programmatically attached to the compute instances may be used as the source and destination addresses of the messages in some embodiments. Such IP addresses may, for example, belong to a subnet defined by a VCS client within an isolated virtual network (IVN) set up for the client by the VCS control plane. In at least some embodiments, configuration information of the IVN, such as the subnets and security rules, may be provided to the edge locations (e.g., to the SCMs and/or to other networking management components running at the edge locations) by the VCS control plane servers, and used by the distributed application components to prepare their messages. In various embodiments, the SCMs and/or the other networking management components may cause the messages to be sent via the secure channels, without using resources at the regional data centers where the control plane servers of the VCS are located.

The control plane may monitor edge-to-edge message latencies as well as changes to the distributed application's layout and IVN configuration in the depicted embodiment (element 619). A control plane server may distribute or propagate, to various SCMs, changes/additions to the networking metadata provided earlier (including for example changes to IVN configurations) in the depicted embodiment as needed, and may cause new edge-to-edge channels to be set up if needed. For example, if additional DUs or CUs are set up for an RBA at a new edge location, networking metadata pertaining to the new edge location may be sent to SCMs at one or more other edge locations, and information about those other edge locations may be sent to an SCM at the new edge location.

It is noted that in various embodiments, some of the operations shown in the flow charts of FIG. 5 and/or FIG. 6 may be implemented in a different order than that shown in the figure, or may be performed in parallel rather than sequentially. Additionally, some of the operations shown in FIG. 5 and/or FIG. 6 may not be required in one or more implementations.

FIG. 7 illustrates example elements of networking metadata which may be provided from a control plane server to connectivity managers at edge locations of a virtualized computing service, according to at least some embodiments. The networking metadata provided to a given secure connectivity manager (SCM) of the kind introduced above may include the network address of the peer SCM 702 in the depicted embodiment, An identifier of a protocol (e.g., a variant of a VPN protocol) and/or a version 706 of the protocol to be used for establishing the secure network channel and transferring messages over the secure network channel may be included in the metadata in some embodiments.

A set of security artifacts 710 (e.g., a cryptographic key or keys, digital certificates, etc.) that may be used for verifying the identity or trustworthiness of a peer SCM may be included in the metadata in some embodiments. The security artifacts may also or instead be used to encrypt transferred messages in various embodiments. In at least one embodiment in which the distributed application components that require connectivity are executed at least in part within compute instances of the VCS, launched within isolated virtual networks, IVN configuration information 716 may be included in the networking metadata. The IVN configuration information may be used for transmitting messages between the components, and may include virtual network interface addresses, subnet identifiers, subnet-to-subnet peering enablement objects, security groups, network access control lists (ACLs) and the like in the depicted embodiment. A given virtual network interface (VNI) may comprise a set of networking metadata, including for example one or more network addresses, that can be programmatically associated with or disassociated from a compute instance. An IVN may comprise one or more subnets in some embodiments, including for example one or more subnets created at the request of a VCS client. If desired, the VCS client may run a portion of a distributed application (such as a DU of an RBA) at one edge location E1 in one subnet SN1 within an IVN, and another portion of the distributed application (such as a CU of the RBA) at a different edge location E2 in a different subnet SN2 of the same IVN or a different IVN. In such a scenario, the VCS client may enable messages to flow between SN1 and SN2 by requesting a subnet-to-subnet peering between SN1 and SN2 via a programmatic request submitted to the VCS control plane. A VCS control plane data structure referred to as a subnet-to-subnet peering enablement object may be created in response to such a request, and an identifier of the a subnet-to-subnet peering enablement object may be included in the metadata sent to the SCMs at each edge location E1 and E2. Before sending a message from SN1 to SN2 via the secure edge-to-edge channel between E1 and E2, the existence and validity of the subnet-to-subnet peering may be checked in some embodiments by an SCM at E1.

Access controls (also known as security groups, network security groups, application security groups, cloud security groups, or compute engine firewalls rules, in various implementations) can act as a virtual firewall to control inbound and outbound traffic associated with a compute instance or other components of IVNs. Information about such access controls may be included in the network metadata provided to connectivity managers in some embodiments. VCS customers or clients can define security groups as policies that can be applied to specific instances, for example, including compute instances run at edge locations as well as compute instances run at regional data centers. When a client launches an instance in an IVN, they can assign one or more security groups to the instance. Security groups can act at the instance level, not the subnet level. Therefore, each instance in a subnet can be assigned to a different set of security groups. For each security group, the client can add rules that control the inbound traffic to instances, and a separate set of rules that control the outbound traffic. Security groups can be stateful, in that return traffic is automatically allowed. Security groups may be assigned to network functions running at network function accelerators in some embodiments.

A client can also set up network access control lists (ACLs) with rules similar to security groups in order to add an additional layer of security to an IVN. Network ACLs operate at the subnet level, support allow rules and deny rules, and automatically apply to all instances in any subnet with which it is associated. Network ACLs may not be stateful, in that return traffic must be explicitly allowed by the rules. The same security group may be used or replicated for multiple compute instances or network functions. A VCS client may use security groups alone if desired without using network ACLs, use network ACLs without using security groups, or use both security groups and network ACLs. In some embodiments in which multiple security rules (security groups and/or network ACLs) are configured for a given set of VCS resources, the VCS client may provide an indication of the order in which the different rules should be applied, in effect indicating the relative priority of the rules. Generally speaking, security groups and/or network ACLs may contain rules indicating restrictions on the set of sources from which network messages are permitted at a given compute instance or network function, and/or the set of destinations to which network messages can be sent from a given compute instance or network function.

While a secure network channel set up by the SCMs may provide the underlay or physical network path for communication between a pair of edge locations, the IVN configuration information (which may be created based on input from VCS client) may be used for controlling communications between virtualized entities such as compute instances at which the application subcomponents run in the depicted embodiment. Other types of networking metadata, not shown in FIG. 7, may be provided to SCMs by the VCS control plane in various embodiments. Updates to the metadata (such as updated keys after key expirations, client-requested updates to the IVN configuration information, and so on) may be propagated to the SCMs by the VCS control plane as and when the updates are determined, and used to transmit post-update messages between application subcomponents.

Figure 8:
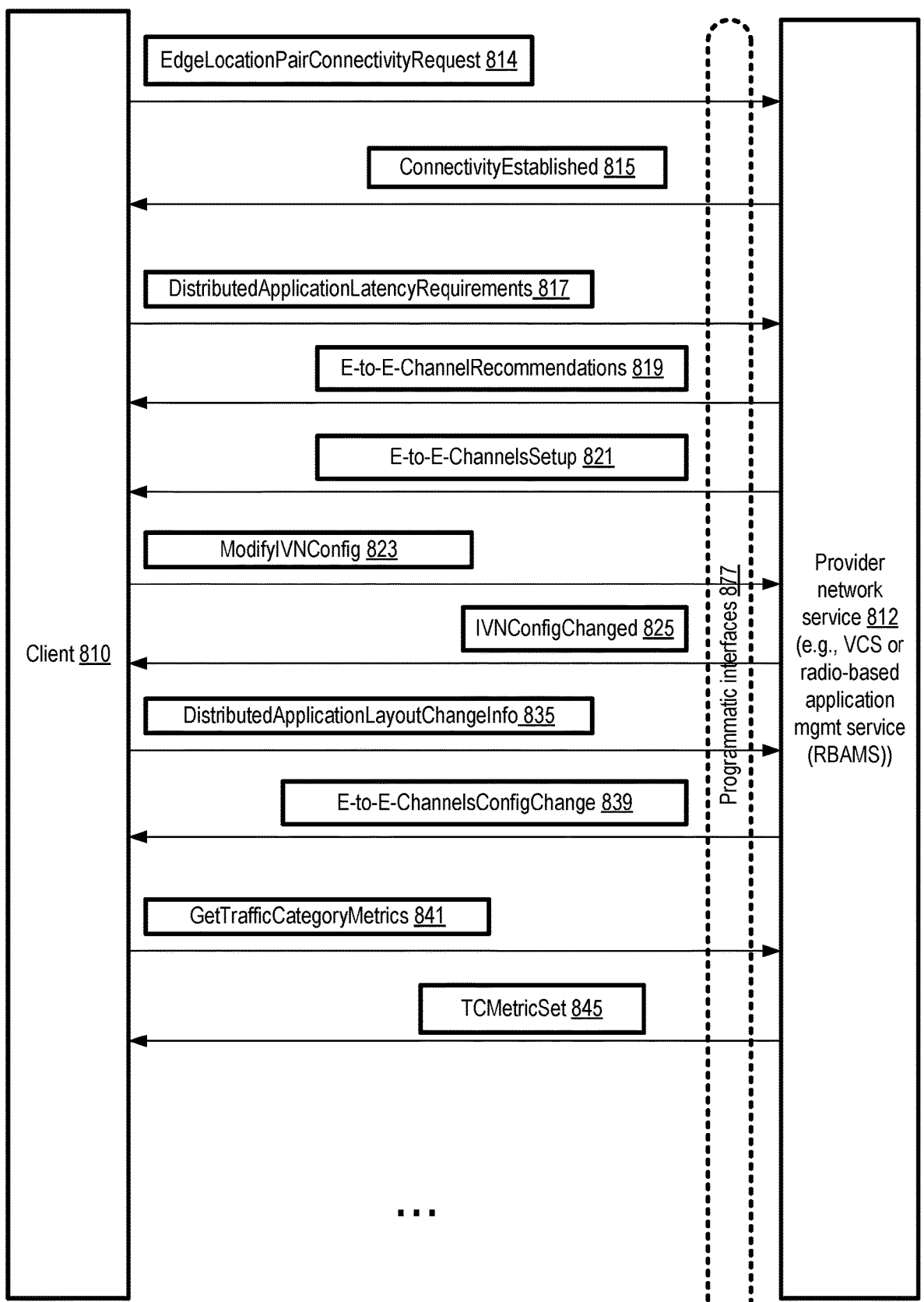
FIG. 8 illustrates example programmatic interactions related to establishment of connectivity between edge locations of a provider network, according to at least some embodiments.

FIG. 8 illustrates example programmatic interactions related to establishment of connectivity between edge locations of a provider network, according to at least some embodiments. In the embodiment depicted in FIG. 8, a cloud provider network service such as a VCS or a radio-based application management service (RBAMS) may implement a set of programmatic interfaces 877, such as a web-based console, command-line tools, APIs, and/or graphical user interfaces, which can be used by clients 810 to submit various types of control plane requests and receive corresponding responses. Using such an interface, a client 810 may submit an EdgeLocationPairConnectivityRequest 814, requesting connectivity between a specified pair of edge locations of the provider network at which respective portions of a distributed application are to be run or are currently running. One or more control plane servers of the service 812 may take the necessary actions to establish the requested connectivity, e.g., including providing respective subsets of networking metadata to SCMs at one or both edge locations in the depicted embodiment. After the SCMs establish a secure channel using the provided metadata, they may inform the control plane that the channel has been established, and a ConnectivityEstablished message 815 may be sent to the client.

Instead of specifying or identifying the particular edge locations between which secure networking channels are to be set up, in one embodiment a client may transmit a DistributedApplicationLatencyRequirements message 817 indicating (a) the logical layout or topology of the distributed application and (b) requirements for message latencies between various types of subcomponents indicated in the logical layout. Using the information about the layout and the latency requirements, the control plane servers may identify specific pairs of edge locations between which secure channels should be set up in various embodiments. In one embodiment, before causing such edge-to-edge channels to be established, the control plane may send an indication of the specific edge locations between which such channels are recommended, e.g., in an E-to-E-ChannelRecommendations message 819. In such an embodiment, the channels may be set up after the client approves the recommendations, and an E-to-E-ChannelsSetup message 821 may be sent to the client to indicate that the channels have been set up successfully. In other embodiments, the control plane may cause the channels to be established without providing a recommendation first.

The networking metadata propagated by the control plane to the SCMs may have to be updated in response to at least two types of events in the depicted embodiment. For example, if the client submits a ModifyIVNConfig request 823, which results in changes (such as changes to security groups, subnet configurations, IP addresses of compute instances, etc.) that could impact the transmission of messages between edge locations connected by secure channels, the relevant changes may be propagated by the control plane to the affected edge locations' SCMs. The control plane may send an IVNConfigChanged message 825 to the client, confirming that the requested modifications have been applied and propagated.

A client may also change the layout of the distributed application, e.g., by adding or removing DUs, CUs, etc., in various embodiments. The client may send a DistributedApplicationLayoutChangeInfo message 835 indicating the changes to the layout to the control plane of the service 812 (e.g., either in advance of the changes taking effect, or after the changes take effect). The changes may be analyzed by the control plane of the, and if changes to the edge-to-edge channels configuration are required, they may be initiated by the control plane. An E-to-E-ChannelsConfigChange message 839 may be sent to the client in some embodiments, indicating the changes (e.g., addition of some channels, removal of other channels) that have been performed with respect to edge-to-edge channels by the control plane.

A client 810 may submit a GetTrafficCategoryMetricSet request 841 in some embodiments, requesting traffic metrics collected by the control plane for one or more classes of traffic of a distributed application, such as latency metrics for messages sent via edge-to-edge channels, latency metrics for messages sent between edge nodes via a region, failures/dropped messages of each class, and so on. The requested metrics may be provided to the client via one or more TCMetricSet messages 845 in some embodiments. In some embodiments, programmatic interactions pertaining to edge-to-edge connectivity establishment and use, other than those shown in FIG. 8, may be supported by the provider network service 812.

Figure 9:
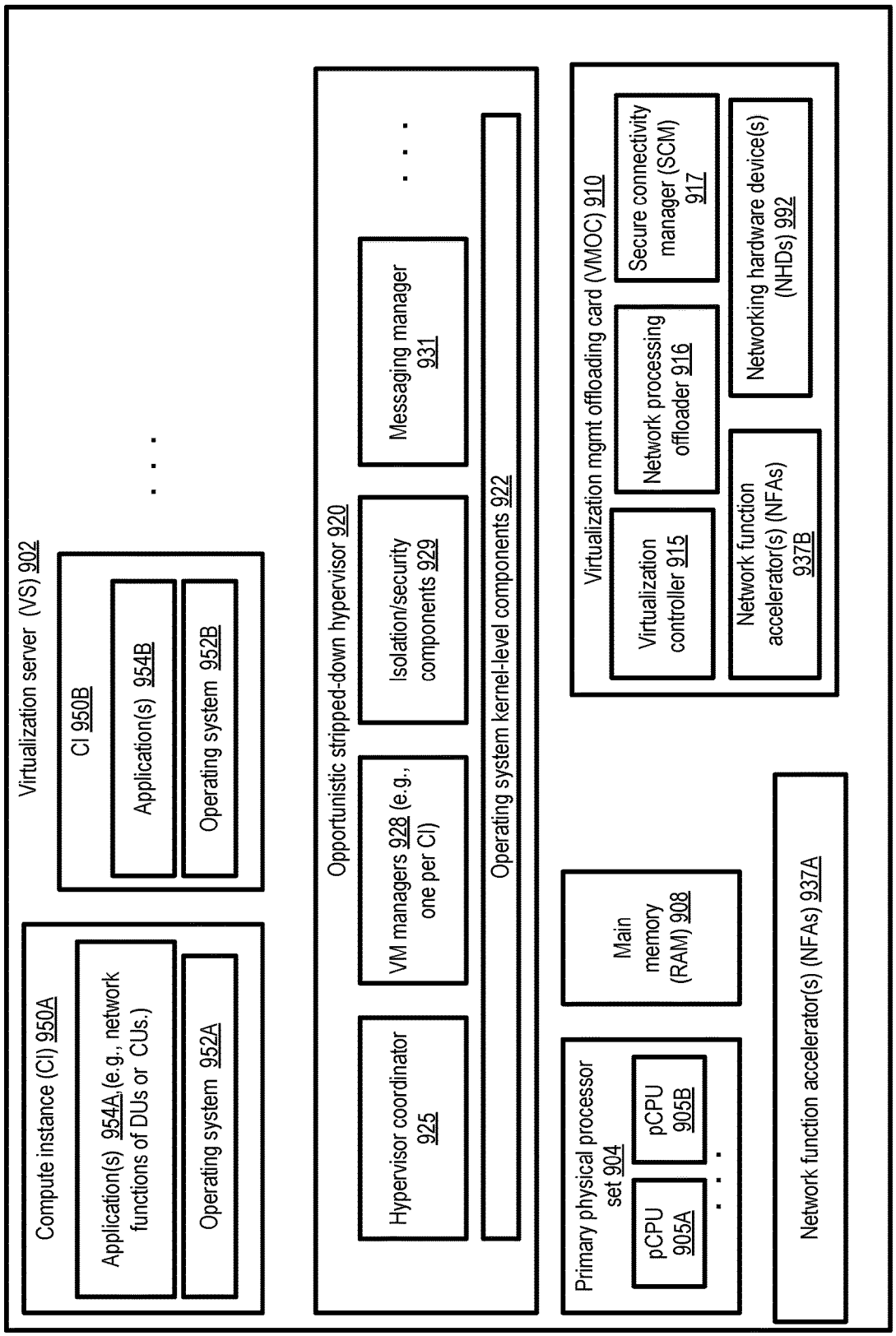
FIG. 9 illustrates example subcomponents of a virtualization server at which a secure connectivity manager may be implemented at an enhanced virtualization management offloading card, according to at least some embodiments.

FIG. 9 illustrates example subcomponents of a virtualization server at which a secure connectivity manager may be implemented at an enhanced virtualization management offloading card, according to at least some embodiments. As shown, a virtualization server (VS) 902 may comprise a primary physical processor set 904, a main memory (e.g., one or more modules of random access memory or RAM) 908, an enhanced virtualization management offloading card (VMOC) 910, an opportunistic stripped down hypervisor 920 which runs on the primary physical processors, and one or more compute instances (CIs) 950, such as CIs 950A and 950B. Applications 954A and/or 954B running at CI 950A and 950B respectively may include portions of distributed applications, such as network functions of CUs or DUs of radio-based applications. Each CI may also include an operating system, such as operating system 952A or operating system 952B. The VS 902 may be utilized as a data plane server at an edge location of a cloud computing environment in various embodiments, and used for implementing a portion of a latency-sensitive distributed application requiring edge-to-edge channels.

VMOC 910 may include one or more network function accelerators (NFAs) 937A, one or more networking hardware devices (NHDs) 992, a virtualization controller 915, a network processing offloader 916 and a secure connectivity manager (SCM) 917 in the depicted embodiment. VS 902 may also comprise a number of other components, e.g., various persistent storage devices, which are not shown in FIG. 9. The primary physical processor set 904 may comprise a number of physical CPUs (pCPUs, also referred to as primary processors), including pCPUs 905A and 905B in the depicted embodiment. Virtualized versions of the pCPUs, called vCPUs or virtual CPUs, may be allocated to individual CIs by virtualization management components, e.g., the hypervisor and/or the virtualization controller during the lifetime of the compute instances. In some embodiments, an SCM may be implemented at least in part at a VCS-owned (rather than a client-requested) compute instance run at the VS, e.g., instead of being implemented fully at the VMOC 910.

The virtualization controller, network processing offloader and the hypervisor 920 may be referred to collectively as a partially offloaded virtualization manager or PVM, as part of the virtualization management tasks needed at the VS may be performed by the hypervisor using the pCPUs, while remaining virtualization management tasks may be performed at the offloading card. The network processing offloader 916 may implement one or more networking protocols (including for example an encapsulation protocol used within the VCS) and act as an intermediary between the compute instances and networking endpoints outside the VS in the depicted embodiment. In some embodiments in which VS 902 is at an edge location, the network processing offloader may utilize an edge-to-edge secure network channel set up by the SCM 917 for certain types of messages, e.g., based on whether the destination to which the message is to be sent is at another edge location to which an edge-to-edge channel has been established. In at least one embodiment the VCS control plane may communicate with the network processing offloader 916 to perform at least some aspects of networking-related configuration operations at the VS, such as assignment of network addresses, changing/applying IVN related settings, and so on. In one embodiment, the SCM may be implemented as part of the networking offloader. In another embodiment, the network processing offloader may be implemented as part of the SCM. The network processing offloader may also be referred to as a message handler or a message route selector in some embodiments.

The virtualization controller 915, network processing offloader 916, SCM 917 and/or NFAs 937B may be implemented using a respective system-on-chip design in some embodiments, e.g., incorporated within a shared offloading card which is linked to the pCPUs via a peripheral interconnect. In other embodiments, field-programmable gate arrays (FPGAs), digital signal processors (DSPs) or other technologies may be used to implement virtualization controllers, networking processing offloaders, SCMs and/or NFAs. Although the virtualization controller 915, the network processing offloader 916, the SCM 917 and the NFAs 937B are shown as being incorporated within a single offloading card 910 (e.g., a PCIe card) in the depicted embodiment, other approaches regarding the arrangement and organization of these components may be employed in different embodiments. For example, in one embodiment, a single system-on-chip implementation may be used to perform the functions of the virtualization controller and the network processing offloader. In another embodiment, respective offloading cards may be used for the virtualization controller 915, the network processing offloader 916, the SCM 917 and/or one or more NFAs 937. In some embodiments in which the VMOC includes NFAs 937B, additional NFAs 937A (e.g., for network functions other than those implemented at NFAs 937B) may be incorporated within other offloading cards.

The virtualization controller, as suggested by its name, may be responsible for organizing or orchestrating much of the virtualization management work performed at the VS 902 in the depicted embodiment—e.g., it may be the first of the components of the PVM to boot, trigger the launches of the other components of the PVM, communicate with the VCS control plane, make memory allocation decisions with respect to compute instances, and so on. In at least one embodiment the network processing offloader and/or the SCM may select a particular NHD 992 to be used for a particular category of traffic (e.g., mid-haul traffic, fronthaul traffic or back-haul traffic of an RBA, or traffic that is not transmitted for an RBA). NHDs may be used for secure network channels of the kind described above in various embodiments.

Hypervisor 920 may be described as being stripped-down in the depicted embodiment because much of the work performed by at least some conventional hypervisors may be handled at the VMOC 910, thereby reducing the complexity and size of the hypervisor 920. In addition, hypervisor 920 may be designated as opportunistic because, under most circumstances, it may wait until a compute instance voluntarily relinquishes control of a pCPU 905 before the hypervisor uses CPU cycles. Thus, for example, when a particular compute instance 950 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where $T2 \ll T1$) while the compute instance is not expecting to use the pCPU. As such, the hypervisor 920 may have a minimal impact on the performance of applications 954 in the depicted embodiment.

The hypervisor 920 may itself comprise a number of subcomponents in the depicted embodiment, including a set of operating system kernel-level components 922, a hypervisor coordinator 925, one or more virtual machine (VM) managers 928, isolation/security components 929, and/or a messaging manager 931. The hypervisor coordinator 925, individual ones of the VM managers 928, the isolation/security components 929 and/or the messaging manager 931 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by compute instances, etc.).

The kernel-level components 922 may provide support for various low-level operations such as the initial responses to VM exit instructions issued by the compute instances (e.g., when a compute instance gives up a pCPU). The hypervisor coordinator 925, as implied by the name, may be responsible for orchestrating operations of the other subcomponents. The hypervisor coordinator 925 may, for example, implement an API which can be used for communications between the components at the VMOC and the hypervisor, initiating compute instance launches and terminations (e.g., at the request of the virtualization controller), exposing metrics collected by the VM managers, providing debugging capabilities, and so on.

Each VM manager 928 may be responsible for launching or instantiating a respective compute instance based on a specification provided by the coordinator 925, monitoring metrics and logs of the compute instance, and so on. In some embodiments a VM manager 928 may also help with compute-instance-requested I/O operations for certain devices, e.g., by trapping I/O requests and translating them to memory-mapped I/O operations completed with the help of an offloaded virtualization management component.

The messaging manager 931 may act as an intermediary between the virtualization controller 915 and the hypervisor, e.g., by translating commands issued using a queue-based protocol by the virtualization controller into pipe messages within the hypervisor. The security and isolation components 929 may be responsible, for example, for scrubbing or cleaning up compute instance memory when a compute instance terminates, so that inadvertent sharing of data across compute instances can be avoided. In some embodiments, the security and isolation components may also be responsible for scrubbing or cleaning up memory of the NFAs 937.

Programs implementing virtualized network functions at one or more layers of a radio-based technology stack may be run as part of the applications 954A or 954B of the CIs in the depicted embodiment. Other network functions may be executed at the NFAs, e.g., in response to requests or messages transmitted from RUs and/or from the programs implemented at the applications. Various aspects of the configuration of the compute instances and the NFAs may be managed by control plane servers of the VCS.

The VMOC 910 may include several other components not shown in FIG. 9 in some embodiments. A secure boot ROM incorporated within the VMOC may be used for an initial phase of a multi-phase boot operation by the virtualization controller in one embodiment. The VMOC may also include a security module (such as a trusted platform module (TPM)), which may also be used extensively during the boot procedure and/or for post-boot state verification. In addition, the offloading card 910 may comprise a number of storage, power and connectivity-related components in various embodiments. For example, one or more flash devices/interfaces (or SSDs) may be incorporated within the offloading card. These devices may be used, for example, to store firmware and/or software corresponding to various virtualization management components, compute instance components, NFAs, and the like. PCIe interfaces of the VMOC may be used for communicating with the hypervisor and/or in various embodiments. In other embodiments, other types of interconnects and corresponding interfaces may be used, such as variants of USB, the QuickPath interconnect (QPI) or the UltraPath interconnect (UPI). The VMOC 910 may also comprise a power source in some embodiments, e.g., sufficient to keep the components of the VMOC working for at least some targeted number of hours or days in the event of extended power failures. In some implementations, a supercapacitor-based power source may be used.

Figure 10:
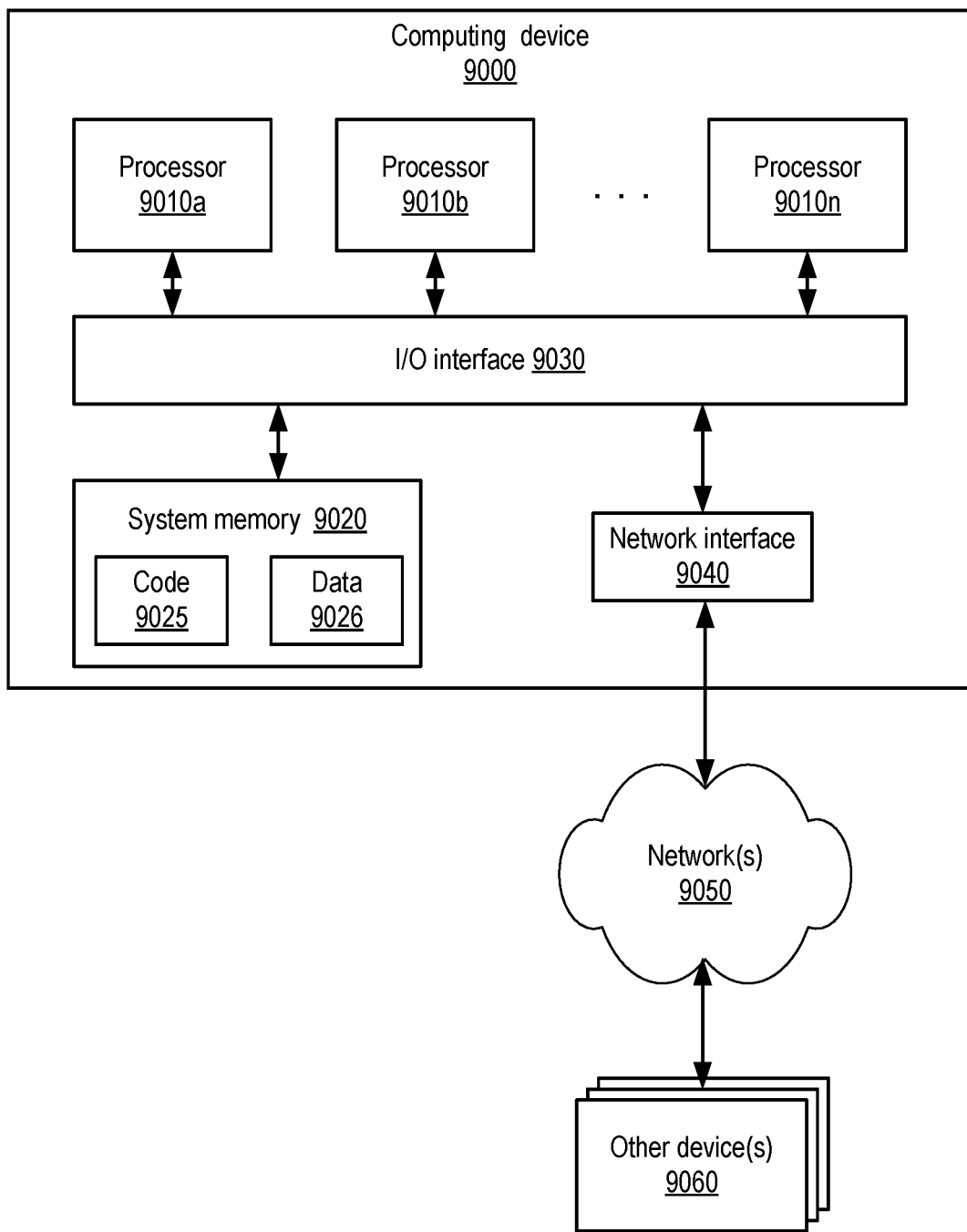
FIG. 10 is a block diagram illustrating an example computing device that may be used in at least some embodiments.

In at least some embodiments, a server that implements the types of techniques described herein (e.g., various functions of a provider network service such as a VCS or a radio-based application management service, including functions implemented within the provider network data centers as well as at edge locations), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
    determining, at a data center of a cloud computing environment, a connectivity requirement for network traffic between a first portion of a distributed application and a second portion of the distributed application, wherein the first portion is implemented at least in part at a first edge location of the cloud computing environment, and wherein the second portion is implemented at least in part at a second edge location of the cloud computing environment;
    causing, based at least in part on the connectivity requirement, an edge-to-edge network channel to be established between the first edge location and the second edge location, wherein traffic transmitted via the edge-to-edge network channel bypasses the data center; and
    causing to be transmitted, to the second portion of the distributed application via the edge-to-edge network channel, a network message originating at the first portion of the distributed application.

2. The computer-implemented method as recited in claim 1, wherein the first portion of the distributed application comprises a network function of a radio-based application.

3. The computer-implemented method as recited in claim 1, wherein the edge-to-edge network channel comprises a Virtual Private Network (VPN) tunnel.

4. The computer-implemented method as recited in claim 1, wherein said determining the connectivity requirement comprises:
receiving a connectivity request via a programmatic interface of a network-accessible service of the cloud computing environment, wherein the connectivity request includes a performance requirement for network messages originating at the first edge location, and wherein the edge-to-edge network channel is established based at least in part on the performance requirement.

5. The computer-implemented method as recited in claim 1, wherein said causing the edge-to-edge network channel to be established comprises:
transmitting, from the data center to the first edge location, metadata associated with the second edge location; and
causing a first connectivity manager at the first edge location to establish the edge-to-edge network channel using at least a portion of the metadata.

6. The computer-implemented method as recited in claim 5, wherein the metadata comprises a security artifact, and wherein said causing the edge-to-edge network channel to be established further comprises:
causing the first connectivity manager to verify, using at least the security artifact, an identity of a second connectivity manager located at the second edge location.

7. The computer-implemented method as recited in claim 5, wherein the metadata comprises configuration information of a virtual private cloud (VPC), and wherein the second portion of the distributed application is implemented within the VPC.

8. A system, comprising:
one or more computing devices;
wherein the one or more computing devices include instructions that upon execution on or across one or more processors:
determine, at a data center of a cloud computing environment, a connectivity requirement for network traffic between a first portion of a distributed application and a second portion of the distributed application, wherein the first portion is implemented at least in part at a first edge location of the cloud computing environment, and wherein the second portion is implemented at least in part at a second edge location of the cloud computing environment;
cause, based at least in part on the connectivity requirement, an edge-to-edge network channel to be established between the first edge location and the second edge location, wherein traffic transmitted via the edge-to-edge network channel bypasses the data center; and
cause to be transmitted, to the second portion of the distributed application via the edge-to-edge network channel, a network message originating at the first portion of the distributed application.

9. The system as recited in claim 8, wherein the first portion of the distributed application comprises a network function of a radio-based application.

10. The system as recited in claim 8, wherein the edge-to-edge network channel comprises a Virtual Private Network (VPN) tunnel.

11. The system as recited in claim 8, wherein to determine the connectivity requirement, the one or more computing devices include further instructions that upon execution on or across one or more processors:
receive a connectivity request via a programmatic interface of a network-accessible service of the cloud computing environment, wherein the connectivity request includes a performance requirement for network messages originating at the first edge location, and wherein the edge-to-edge network channel is established based at least in part on the performance requirement.

12. The system as recited in claim 8, wherein to cause the edge-to-edge network channel to be established, the one or more computing devices include further instructions that upon execution on or across one or more processors:
transmit, from the data center to the first edge location, metadata associated with the second edge location; and
establish, by a first connectivity manager at the first edge location, the edge-to-edge network channel using at least a portion of the metadata.

13. The system as recited in claim 12, wherein the metadata comprises a security artifact, and wherein to cause the edge-to-edge network channel to be established, the one or more computing devices include further instructions that upon execution on or across one or more processors:
verify, by the first connectivity manager, using at least the security artifact, an identity of a second connectivity manager located at the second edge location.

14. The system as recited in claim 12, wherein the metadata comprises configuration information of a virtual private cloud (VPC), and wherein the second portion of the distributed application is implemented within the VPC.

15. One or more non-transitory computer-accessible storage media storing program instructions that when executed on or across one or more processors:
determine, at a data center of a cloud computing environment, a connectivity requirement for network traffic between a first portion of a distributed application and a second portion of the distributed application, wherein the first portion is implemented at least in part at a first edge location of the cloud computing environment, and wherein the second portion is implemented at least in part at a second edge location of the cloud computing environment;
cause, based at least in part on the connectivity requirement, an edge-to-edge network channel to be established between the first edge location and the second edge location, wherein traffic transmitted via the edge-to-edge network channel bypasses the data center; and
cause to be transmitted, to the second portion of the distributed application via the edge-to-edge network channel, a network message originating at the first portion of the distributed application.

16. The one or more non-transitory computer-accessible storage media as recited in claim 15, wherein the first portion of the distributed application comprises a network function of a radio-based application.

17. The one or more non-transitory computer-accessible storage media as recited in claim 15, wherein the edge-to-edge network channel comprises a Virtual Private Network (VPN) tunnel.

18. The one or more non-transitory computer-accessible storage media as recited in claim 15, wherein to determine the connectivity requirement, the one or more non-transitory computer-accessible storage media store further program instructions that when executed on or across the one or more processors:
receive a connectivity request via a programmatic interface of a network-accessible service of the cloud computing environment, wherein the connectivity request includes a performance requirement for network messages originating at the first edge location, and wherein the edge-to-edge network channel is established based at least in part on the performance requirement.

19. The one or more non-transitory computer-accessible storage media as recited in claim 15, wherein to cause the edge-to-edge network channel to be established, the one or more non-transitory computer-accessible storage media store further program instructions that when executed on or across the one or more processors:
   transmit, from the data center to the first edge location, metadata associated with the second edge location; and
   establish, by a first connectivity manager at the first edge location, the edge-to-edge network channel using at least a portion of the metadata.

20. The one or more non-transitory computer-accessible storage media as recited in claim 19, wherein the metadata comprises a security artifact, and wherein to cause the edge-to-edge network channel to be established, the one or more non-transitory computer-accessible storage media store further program instructions that when executed on or across the one or more processors:
   verify, by the first connectivity manager, using at least the security artifact, an identity of a second connectivity manager located at the second edge location.

* * * * *